United States Patent [19]

Powell et al.

[11] Patent Number: 4,654,957
[45] Date of Patent: Apr. 7, 1987

[54] FLEXIBLE MACHINING APPARATUS WITH SINGLE SHANK TOOL AND MUTLI-SPINDLE TOOL HEAD CHANGING AND OPERATING CAPABILITIES

[75] Inventors: Thomas A. Powell; Kenneth O. Kolnes; Kenneth J. Sprenger; John D. Casarotto; Kenneth P. Whitney; Gerald M. Hammer, all of Rockford, Ill.

[73] Assignee: Ex-Cell-O Corporation, Troy, Mich.

[21] Appl. No.: 623,678

[22] Filed: Jun. 22, 1984

[51] Int. Cl.⁴ ............................................. B23Q 3/157
[52] U.S. Cl. ..................................... 29/568; 29/26 A; 408/35
[58] Field of Search ......................... 29/568, 264, 563; 408/35; 409/231, 232

[56] References Cited

U.S. PATENT DOCUMENTS

| | | | |
|---|---|---|---|
| 3,520,228 | 7/1970 | Wohlfeil | 409/231 X |
| 3,543,392 | 12/1970 | Perry et al. | 29/568 X |
| 3,762,036 | 10/1973 | Goebel et al. | 29/568 |
| 3,797,363 | 3/1974 | Nohesl | 408/35 X |
| 3,851,380 | 12/1974 | Kerimoto et al. | 29/568 |
| 3,895,427 | 7/1975 | Nakao et al. | 29/568 |
| 3,979,819 | 9/1976 | Nomura et al. | 29/568 |
| 4,109,360 | 8/1978 | Hillman | 408/35 X |
| 4,110,897 | 9/1978 | Hipwell et al. | 29/568 |
| 4,354,306 | 10/1982 | Ida et al. | 29/568 |
| 4,356,609 | 11/1982 | Wollerman | 409/231 X |
| 4,558,506 | 12/1986 | Kielma | 29/568 |

FOREIGN PATENT DOCUMENTS

| | | | |
|---|---|---|---|
| 3009357 | 10/1981 | Fed. Rep. of Germany | 29/568 |
| 71014 | 4/1983 | Japan | 29/568 |
| 8100533 | 3/1981 | PCT Int'l Appl. | 29/568 |

*Primary Examiner*—Gil Weidenfeld
*Assistant Examiner*—Glenn L. Webb
*Attorney, Agent, or Firm*—Edward J. Timmer

[57] ABSTRACT

The machining apparatus includes a machine tool having a primary spindle slide with a transversely extending tool head support rail member thereon which is aligned successively with a tool head load rail mechanism and unload rail mechanism on a side of the machine tool by movement of the primary spindle slide to load or unload a multi-spindle tool head. When the tool head is loaded in operative position on the rail member, the spindles of the tool head are driven by the primary spindle through a gear train in the tool head. An overhead gantry robot conveys tool heads between the load and unlaod rail mechanisms and a stationary tool head storage unit on the side of the machine tool.

A single shank tool conveyor assembly is disposed on the other side of the machine tool and a pivotal tool changer is located on that side to exchange single shank tools between the primary spindle itself and a tool chain conveyor on the tool conveyor assembly when the machine tool is not in operation using a single or multi-spindle tool head.

The machine tool, load and unload mechanisms, overhead robot, pivotal tool changer and tool conveyor assembly are controlled by a common programmable computer. The machine tool can be operated in the single shank tool mode or single or multi-spindle tool head mode automatically without manual change-over or modification thereof.

5 Claims, 27 Drawing Figures

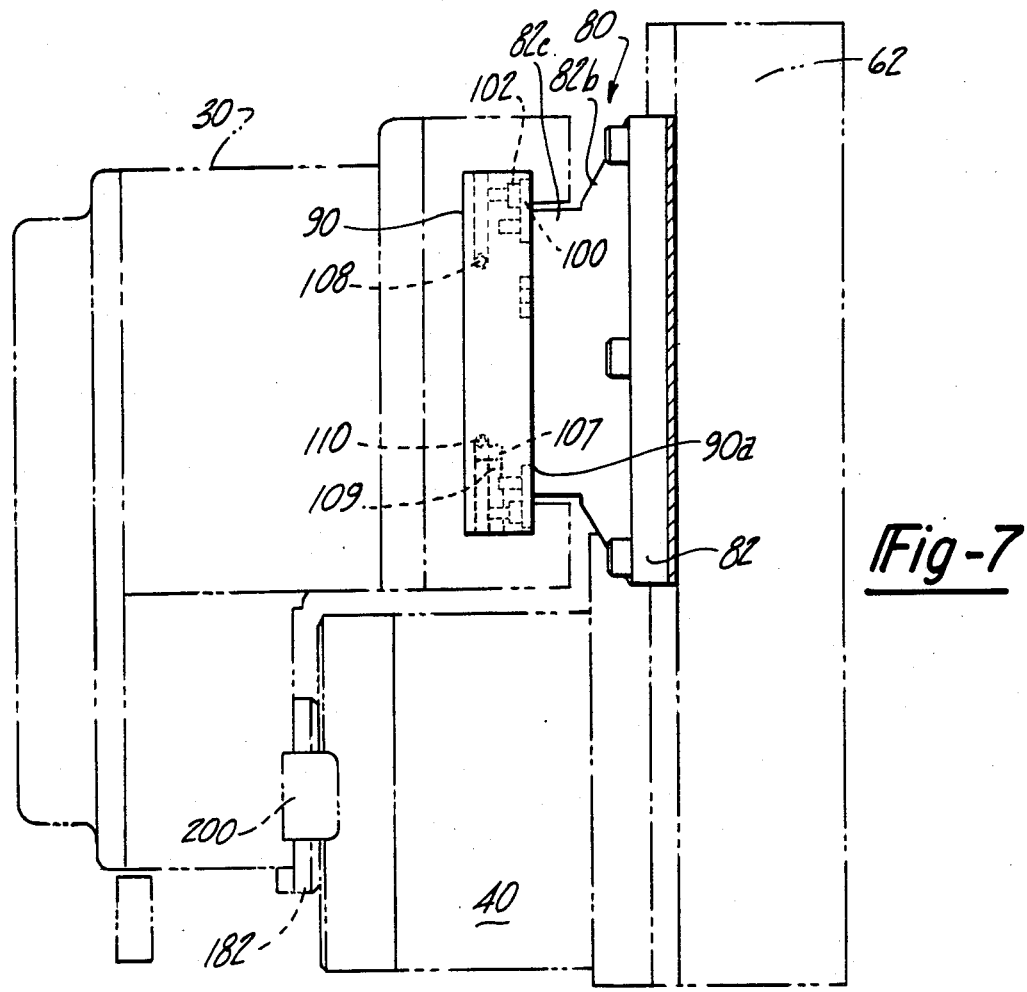
_Fig-7_
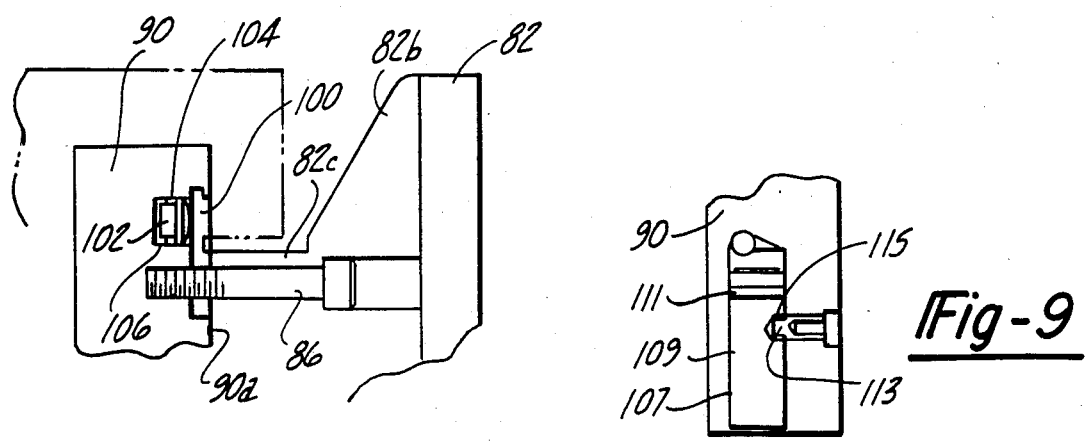
_Fig-8_    _Fig-9_

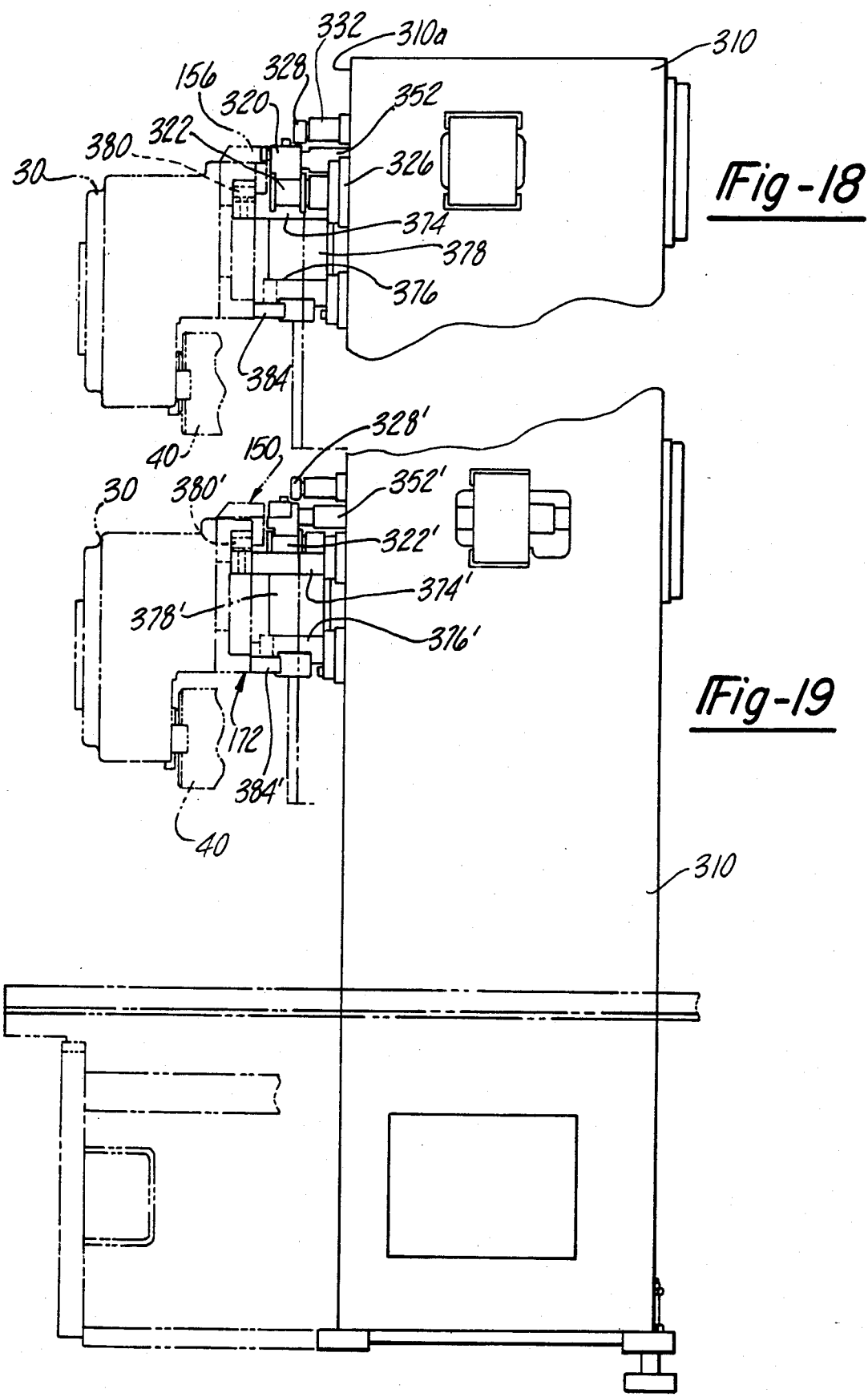

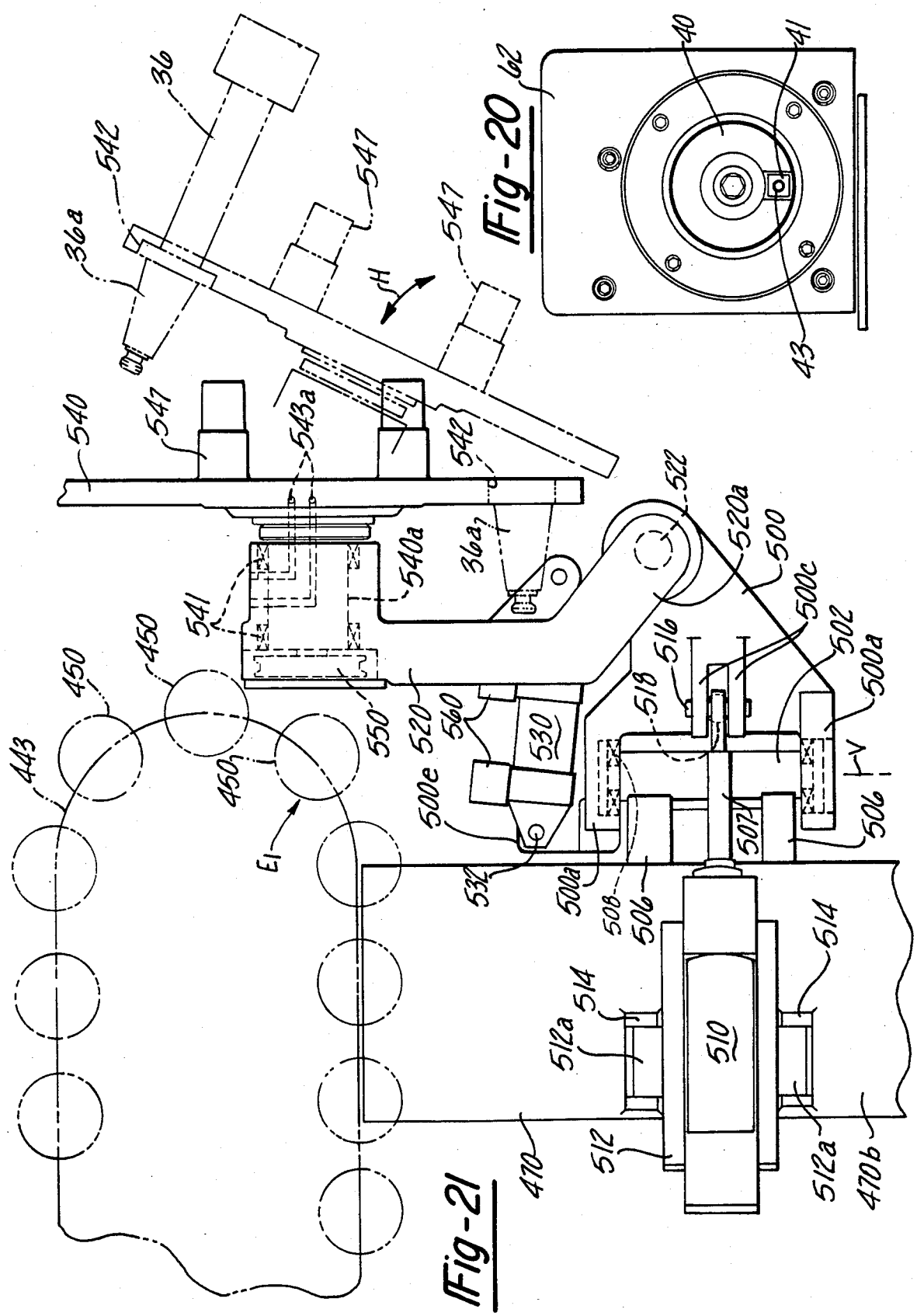

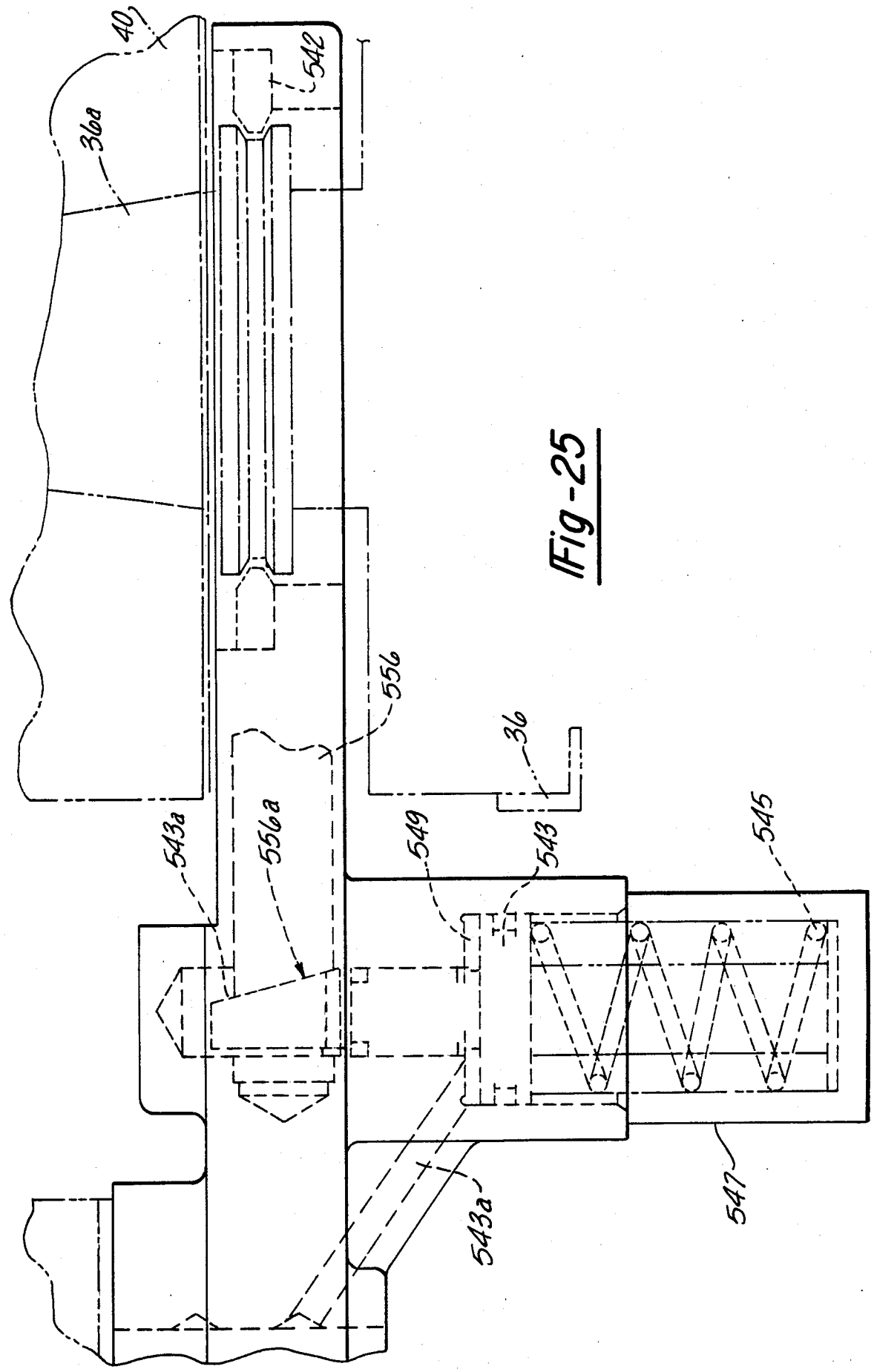

FLEXIBLE MACHINING APPARATUS WITH SINGLE SHANK TOOL AND MULTI-SPINDLE TOOL HEAD CHANGING AND OPERATING CAPABILITIES

FIELD OF THE INVENTION

The invention relates to flexible machining apparatus and, in particular, to a flexible machining apparatus having single shank tool and multiple spindle tool head changing and operating capability and to a machine tool having novel rail load/unload mechanisms on and adjacent the primary spindle slide for exchanging multi-spindle tool heads relative to the primary spindle of the machine tool to provide multiple spindle capability in addition to single shank tool capability and further to a tool head loaded and unloaded thereon.

BACKGROUND OF THE INVENTION

Machine tools including tool storage units and tool changers are shown in the following patents:
U.S. Pat. No. 3,173,204 issued Mar. 16, 1965
U.S. Pat. No. 3,191,260 issued June 29, 1965
U.S. Pat. No. 3,316,629 issued May 2, 1967
U.S. Pat. No. 3,524,248 issued Aug. 18, 1970
U.S. Pat. No. 3,619,898 issued Nov. 16, 1971
U.S. Pat. No. 3,678,572 issued July 25, 1972
U.S. Pat. No. 3,719,987 issued Mar. 13, 1973
U.S. Pat. No. 3,975,817 issued Aug. 24, 1976
U.S. Pat. No. 4,173,817 issued Nov. 13, 1979

Machine tools including a rotatable multi-spindle tool head storage magazine and transfer or exchanger mechanisms to exchange one tool head for another are illustrated in the following patents:
U S. Pat. No. 3,650,018 issued Mar. 21, 1972
U.S. Pat. No. 4,110,898 issued Sept. 5, 1978
U.S. Pat. No. 4,125,932 issued Nov. 21, 1978
U.S. Pat. No. 4,403,391 issued Sept. 13, 1983

An automated manufacturing system including multiple numerical controlled (NC) machine tools is described in U.S. Pat. No. 4,309,600 issued Jan. 5, 1982. The system includes a rotatable cluster head tool changer containing single and multiple spindle tool heads. An overhead conveyor is employed to transport workparts through different machining routes.

U.S. Pat. No. 3,952,388 issued Apr. 27, 1976 and U.S. Pat. No. 4,369,563 issued Jan. 25, 1983 also illustrate automated manufacturing systems with multiple machine tools having tool storage units and tool changers. Other automated manufacturing systems are disclosed in the following:
U.S. Pat. No. 3,530,571 issued Sept. 29, 1970
U.S. Pat. No. 3,543,392 issued Dec. 1, 1970
U.S. Pat. No. 3,576,540 issued Apr. 27, 1971
U.S. Pat. No. 3,909,922 issued Oct. 7, 1976
U.S. Pat. No. 4,237,598 issued Dec. 9, 1980
U.S. Pat. No. 4,321,679 issued Mar. 23, 1982

SUMMARY OF THE INVENTION

The invention contemplates a machining apparatus having increased flexibility in operating modes by virtue of including, in addition to a machine tool, a first tool storage unit for single shank tools, a second tool head storage unit for single or multi-spindle tool heads, a single shank tool changing mechanism, a tool head changing mechanism for exchanging a tool head with respect to the machine tool drive spindle via a tool head support means on the primary spindle slide, and means for moving tool heads between the tool head storage position and tool head changing position. The tool head changer, tool head storage unit and means for moving tool heads between a storage position and a changing position may be separate components or combined into a multi-functional unit to that end. Preferably, the tool head support means includes a tool head support rail mechanism carried on the primary spindle slide transversely of the spindle axis movable with the primary spindle slide to tool head load and unload positions relative to the tool head changing mechanism and supportively carrying a mounting flange on the tool head when the tool head is loaded on the primary spindle slide. The rail mechanism preferably includes clamping means for releasably clamping a tool head in position on the primary spindle slide with a driven gear of the tool head releasably coupled to the primary drive spindle so that the latter can drive the single or multiple spindles of the tool head through a gear train in the tool head.

The invention also contemplates a flexible machining apparatus having a machine tool with movable spindle slide means and a tool head support rail means on the slide means extending transversely toward a side of the machine tool. The support rail means on the primary spindle slide and a tool head changing means, preferably including a load rail mechanism and unload rail mechanism both including rollers for movably supporting a tool head, adjacent the side of the machine, are relatively movable to place the support rail means and tool head changing means in an end-to-end relation. The load rail mechanism preferably has an actuator to push a tool head from a roller load rail mechanism onto the support rail means on the primary spindle slide into drivingly coupled relation to the primary spindle when aligned generally end-to-end and the unload rail mechanism has an actuator to pull a tool head off of the support rail means of the primary spindle slide onto a roller unload rail mechanism.

The invention further contemplates a single or multi-spindle tool head for such a machining apparatus having a housing with a pair of spaced facing clamped surfaces extending transversely relative to the primary spindle axis and defining a rail-receiving channel therebetween. A rail member mounted transversely on the primary spindle slide includes a clamping portion adapted to be received in the channel and having clamping means engageable with a clamped surface on the tool head housing to releasably mount the tool head on the rail member in driving relation to the primary spindle. Actuation of the clamping means against one clamped surface draws and clamps the other clamp surface against the opposite side of the rail member. The clamping means preferably comprises an elongated pressure plate on the rail member engageable with the clamped surface on the tool head housing by means of a hydraulically actuated elongated clamp bar slidably and sealingly mounted in the rail member deflecting the pressure plate toward the clamped surface. Release of hydraulic pressure releases engagement and permits removal of the tool head from the rail member. In the clamped position on the primary spindle slide, a driven gear on the tool head housing is drivingly coupled to the primary drive spindle to drive single or multiple spindles on the tool head through a gear train in the tool head housing. In a preferred embodiment, the tool head housing includes upper and lower hook-like flanges each with spaced facing clamped surfaces and the rail member includes upper and lower clamping means operative to clamp a respective clamped surface on the tool head housing flanges in a direction toward the primary spindle slide. Piston clamps are also provided on the rail member to exert a clamping force on other surfaces of the tool head housing normal to the clamping direction provided by the upper and lower clamping means.

In a typical working embodiment of the invention, a flexible machining apparatus includes a machine tool with a primary drive spindle on the vertical spindle slide and a tool head support rail is mounted on the spindle slide spaced above the primary spindle and extends transversely of the spindle past the housing of the slide in cantilever fashion toward a load/unload mechanism adjacent the side of the machine tool. A single or multi-spindle tool head storage unit is positioned adjacent that side of the machine tool and includes multiple tool head storage compartments where the tool heads can not only be stored but also subjected to repair, tool replacement and other operations by an individual via overhead protected aisleways throughout the storage unit. An overhead gantry robot includes a support frame allowing the robot to travel between the individual storage areas and the tool head load/unload mechanisms adjacent the machine tool. In particular, the robot can transfer a single or multi-spindle tool head from the storage unit to an upper roller load rail immediately adjacent the side of the machine tool. The robot can also convey a previously used tool head from a lower roller unload rail back to the storage unit. For loading and unloading of a tool head onto the machine tool, the primary spindle slide is moved to position the tool head support rail in generally end-to-end relation with either the load rail or unload rail. When the tool head rail is generally end-to-end with the load rail, an actuator pushes the tool head along the load rail onto the support rail to an operative position above the primary spindle with the primary spindle drivingly coupled to a driven gear of the tool head as determined by stop means on the tool head support rail. When the tool head support rail and unload rail are generally end-to-end for unloading, an actuator associated with the unload rail pulls a previously used tool head off the tool head support rail after it is unclamped and onto the unload rail for pick-up and transport back to the tool head storage unit by the overhead robot. A single shank tool conveyor assembly is positioned on the opposite side of the machining tool and a pivotal tool changer is operative to exchange single shank tools between the primary spindle and the tool conveyor assembly when single or multi-spindle tool heads are not in use. The pivotal tool changer includes a lower pivot arm that swings about a pivot axis normal to the spindle axis for swinging movement between the spindle axis and axis of a tool in the exchange position in the tool conveyor assembly. The spindle axis and tool axis in the tool exchange position in the tool conveyor assembly are angularly disposed relative to one another, typically at a 90° angle. An upper pivot arm is pivotally mounted on the lower pivot arm about a pivot axis normal to the lower pivot arm axis for swinging movement toward and away from the spindle and tool conveyor assembly at tool exchange positions. The machine tool, overhead robot, load and unload actuators, single shank tool conveyor assembly, tool changer and other system components are controlled by a common programmable computer.

DESCRIPTION OF THE DRAWINGS

FIG. 7 is a side elevation of the rail member shown in FIG. 6 in the direction of arrow 7.

FIG. 8 is a sectional view along lines 8—8 in FIG. 6.

FIG. 9 is a sectional view along lines 9—9 in FIG. 6.

FIG. 18 is a side elevation of the load mechanism of FIG. 16 in direction of arrows 18.

FIG. 19 is a side elevation of the unload mechanism of FIG. 17 in the direction of arrows 19.

FIG. 20 is a front elevation of the primary spindle of the machine tool showing the drive key bolted thereto.

FIG. 21 is a side elevation of the pivotal tool changer in a tool exchange position relative to the primary spindle.

FIG. 25 is a partial sectional view taken through the tool changer arm.

DESCRIPTION OF PREFERRED EMBODIMENTS

Figure 1:
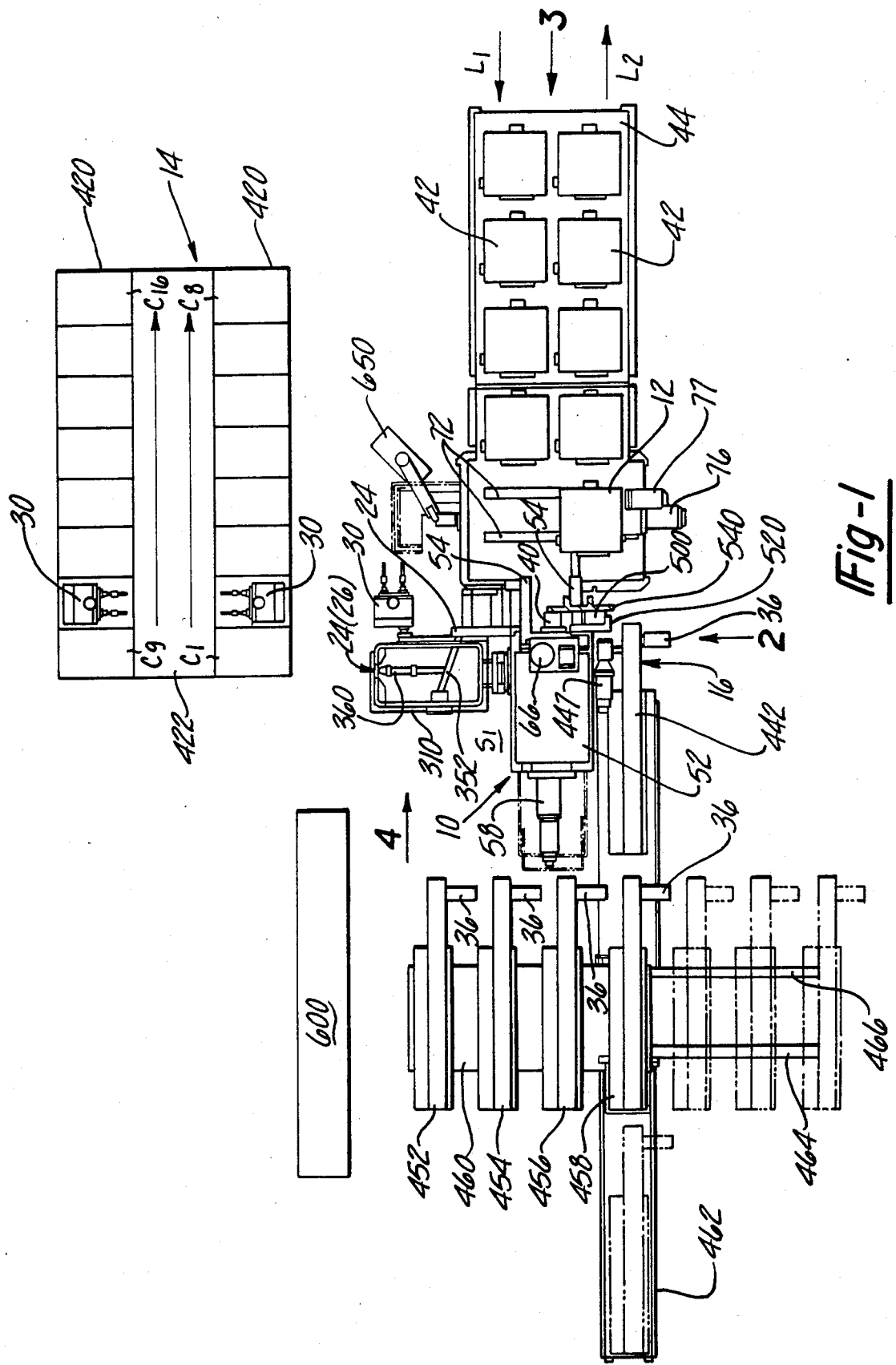
FIG. 1 is a plan view of a machining apparatus in accordance with the invention.
Figure 2:
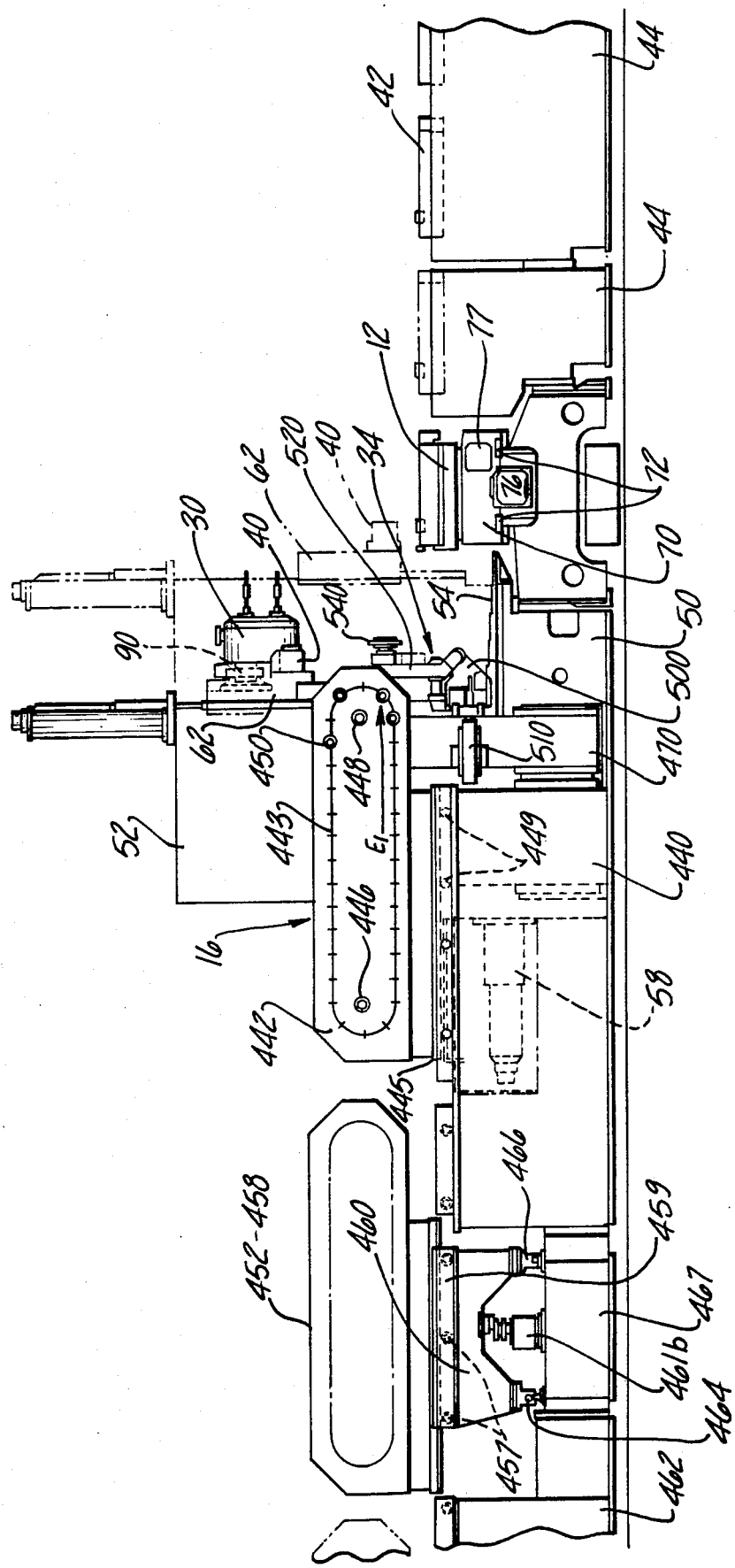
FIG. 2 is a side elevation of the apparatus of FIG. 1 in the direction of arrow 2.

FIGS. 1-4 and 26A-26B illustrate a flexible machining apparatus constructed in accordance with the invention having various modes of machining operation and thus advantageous for use alone or as a component or machining cell in a flexible manufacturing system.

The machining apparatus includes a four-axis machining tool 10 having a work table 12 in front thereof, a stationary tool head storage unit 14 adjacent one side $S_1$ thereof and a single shank tool storage unit 16 adjacent another side $S_2$ thereof oppositely disposed from side $S_1$. As will be explained in more detail hereinbelow, an overhead gantry robot 20 movably mounted on overhead support frame 22 shuttles between the head storage unit 14 and a tool head load mechanism 24 and tool head unload mechanism 26 at side $S_1$ to exchange a single or multi-spindle tool head 30. Furthermore, a pivotal tool changer 34 is located at side $S_2$ to exchange a single shank tool 36 between tool storage unit 16 and the primary spindle 40 of the machine tool 10. Multiple work-part pallets 42 are queued on a pallet support base 44 and are successively movable from the pallet load line $L_1$ to the work table 12 and then to the unload line $L_2$ after machining.

The machine tool 10 comprises a base 50 on which a column 52 is slidably mounted in the Z-axis. In particular, the base includes a pair of parallel spaced Z-axis slide ways 54 and the column includes complementary surfaces slidably supported thereon in known fashion. Movement of the column 52 along the Z-axis is effected by a servo motor 58 and ball screw (not shown) preferably of the type described in co-pending U.S. application Ser. No. 624,862 entitled "Ball Screw Assembly Mount For Machine Slide" filed in the names of Thomas A. Powell, Kenneth O. Kolnes, Friedrich Burkhardt and Hans Staiger and of common assignee herewith, the teachings of which are incorporated herein by reference.

Figure 5:
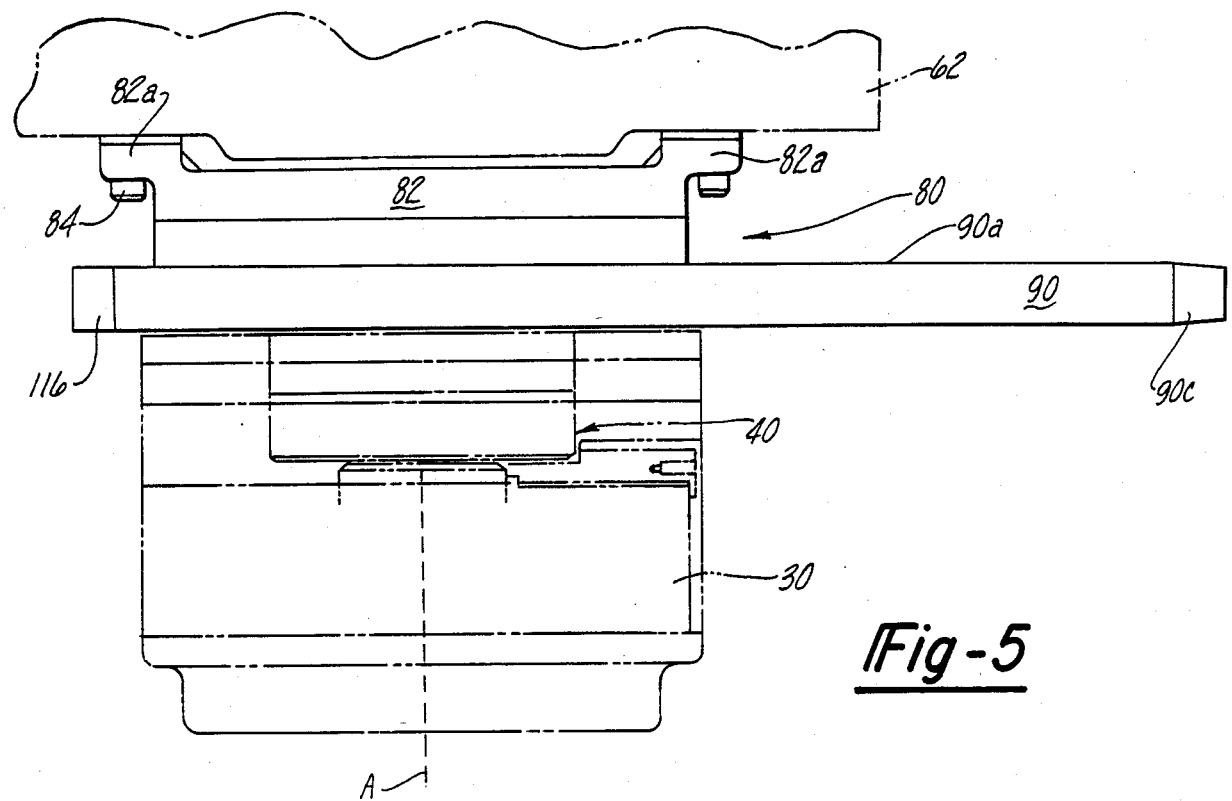
FIG. 5 is a plan view of the tool head support rail member carried on the primary spindle slide.

The column 52 itself carries spaced parallel Y-axis slide ways 60 on which the primary spindle slide 62 is slidably mounted for movement in the vertical direction. The primary spindle slide 62 includes complementary surfaces slidably engaged on the Y-axis slide ways, FIG. 5. Servo motor 66 and ball screw 67 like that driving the column 52 on the Z-axis and described in the aforementioned co-pending application entitled "Ball Screw Assembly Mount For Machine Slide" are also used to move the primary spindle slide 62 along the Y-axis slide ways.

The work part table 12 is mounted on an X-axis slide 70 which is slidably mounted on X-axis ways 72 of X-axis base 74 for movement perpendicular to the Z-axis movement. A servo motor 76 and ball screw (not shown) like that described hereinabove for the Z-axis movement is employed to drive the slide 70 along the X-axis. The work part table 12 itself is a rotary index table mounted on the X-axis slide 70 and may be indexed angularly in increments or rotated for contouring. The table 12 is described in the Burkhardt and Staiger U.S. Pat. No. 4,274,773 issued June 23, 1981 of common assignee herewith, the teachings of which are incorporated herein by reference. The table 12 is indexed or rotated by a conventional servo motor 77 through a worm drive (not shown but described in U.S. Pat. No. 4,274,773) about the so-called vertical B-axis through the geometric center of the table 12.

The work part pallets 42 are individually and successively loaded onto the table 12 and locked in position for machining of the work part fixtured on the pallet. The pallets 42 can be conveyed between the different positions shown and locked on table 12 by known means which forms no part of this invention.

The primary spindle slide 62 is shown in greater detail in FIGS. 5-8. Primary spindle slide 62 includes a housing 62a and rotatable primary tool driving spindle 40 which may be of generally conventional construction, e.g., as described in the Voglrieder and Hempel U.S. Pat. No. 4,173,819 issued Nov. 13, 1979 of common assignee herewith, the teachings of which are incorporated herein by reference. A radial drive key 41 is attached by machine screw 43 to the front face of the rotatable spindle 40 as shown in said patent and in FIG. 20 for purposes to be explained herebelow.

Mounted exteriorly on the primary spindle slide 62 spaced above the primary spindle 40 is a tool head support rail mechanism 80. As shown best in FIGS. 5-6, the rail mechanism 80 comprises a main rail support plate 82 with flanges 82a attached to the primary spindle slide 62 by multiple attachment machine screws 84 received in threaded bores (not shown) in the slide 62. The rail support plate 82 includes a beveled extension portion 82b terminating in a rail abutment portion 82c. Attached fixedly to the rail abutment portion 82c by multiple machine screws 86 (one shown) is tool head support rail member 90. As shown, machine screws 86 are received in bores 92 in rail support plate 82 and threaded bores 94 in the rail member 90. It is apparent that rail member 90 extends transversely or perpendicularly to the primary spindle rotational axis A and Y-axis slide ways 60 and is cantilevered past the side 62b of the primary spindle slide 62 toward side $S_1$ of the machine tool 10. Of course, the spindle slide housing 62a could be cast or machined to provide a tool head support rail member integral therewith and residing inwardly in the front or forward face of the slide 62 facing table 12.

As a result of being fixedly attached to the primary spindle slide 62, the rail member 90 is movable therewith in the vertical direction for purposes to be explained herebelow. Rail member 90 also moves with slide 62 in the Z-axis direction as a result of the latter being carried on column 52 which is slidable in that direction as described above.

Figure 6:
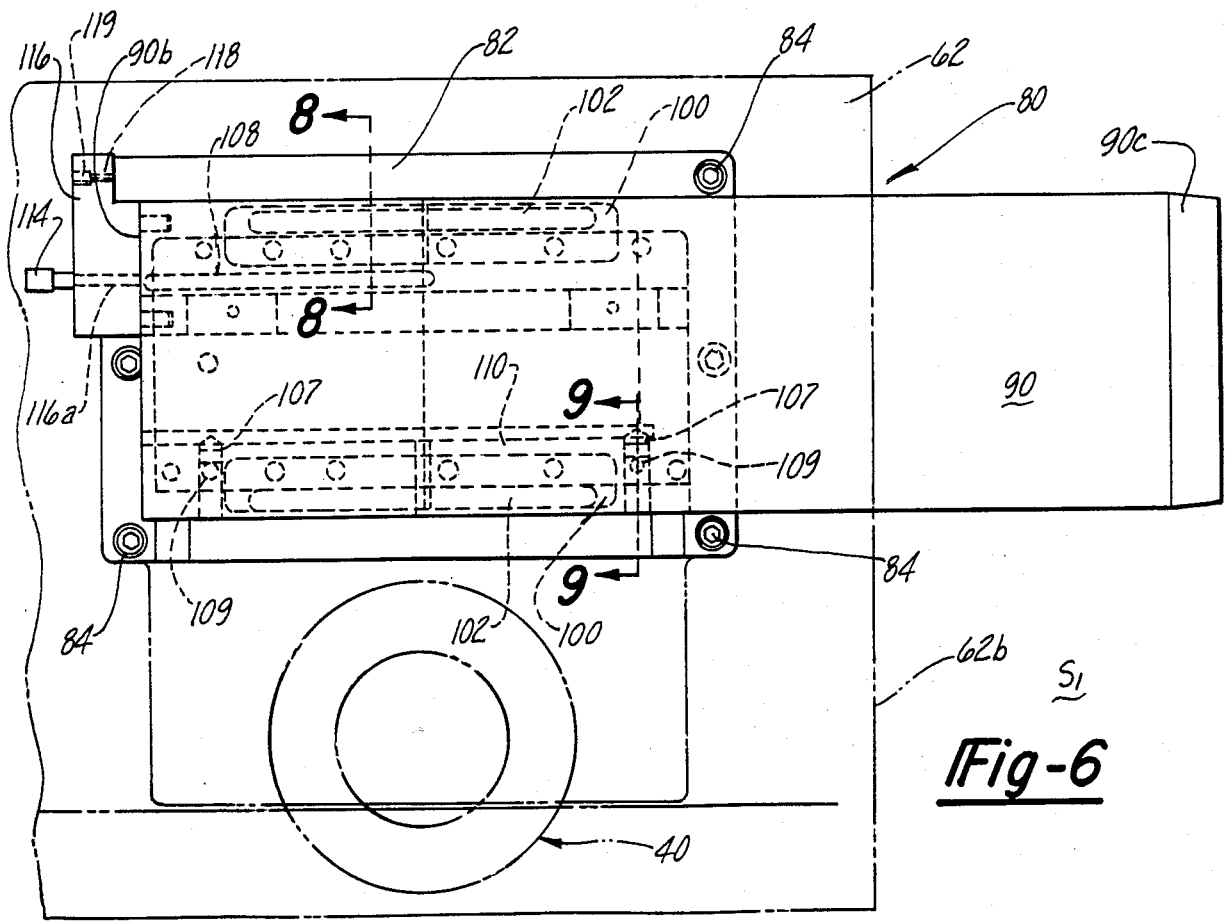
FIG. 6 is a front elevation of the rail member of FIG. 5 to show the clamping means.

The rail member 90 is provided with a pair of upper and lower elongated deflectable clamping pressure plates 100 extending transversely as shown in FIG. 6 and resiliently movable toward the primary spindle slide 62 as shown in FIG. 8 by similarly elongated upper and lower clamp bars 102 which are hydraulically actuated. The clamp bars 102 each include an oil seal 104 of complementary elongated shape to slidably and sealingly locate the clamp bars in elongated oval counterbores 106 in the rail member 90, FIG. 8. Pressurized hydraulic fluid is supplied to counterbores 106 by suitable fluid supply passages 108,110 shown which are connected to an external source (not shown) of hydraulic fluid through appropriate flexible fluid lines (not shown).

Application of suitable hydraulic pressure to counterbores 106 will cause the clamp bars 102 to deflect the clamp pressure plates 100 toward the primary spindle slide 62, i.e., in an outward direction relative to rear surface 90a of the rail member, FIG. 8. Operation of the clamping mechanism described will be discussed in detail hereinbelow.

The lower oil passage 110 also communicates with a pair of spaced counterbores 107 extending to the bottom of the rail member 90, as best seen in FIG. 9. In each counterbore 107 is disposed a piston clamp 109 having O-ring seal 111. The piston clamps are biased downwardly in FIGS. 6 and 9 when hydraulic pressure is applied to clamp bars 102. Movement of the piston clamps 107 is limited by a stop screw 113 received in a lateral slot 115 in each piston clamp 109. The purpose of piston clamps will be described below.

Attached on the end 90b of the rail member 90 adjacent side $S_2$ of the machine tool is a stop block 116. The stop block is attached by multiple machine screws (not shown) and includes a transverse bore 116a connected to an oil fitting 114 to admit hydraulic fluid to upper passage 108. The stop block also includes an air aperture 118 in communication with a larger transverse bore 119 adapted to receive a fitting (not shown) for pressurized air so that aperture 118 can function with an air sensor (not shown) for determining when a tool head 30 is in proper drivingly coupled position on the rail member 90 as will be explained.

The rail member 90, as already mentioned, moves with the primary spindle slide 62 in the vertical (Y axis) and Z-axis directions. The rail member 90 includes a free end 90c which is tapered, FIG. 5, and adapted to be positioned in generally end-to-end relationship with the upper tool head load mechanism 24 and lower tool head unload mechanism 26 by vertical movement of the primary spindle slide 62 and Z-axis movement of column 52 when the machine tool is to be operated using a single or multi-spindle tool head 30 from head storage unit 14.

Figure 10:
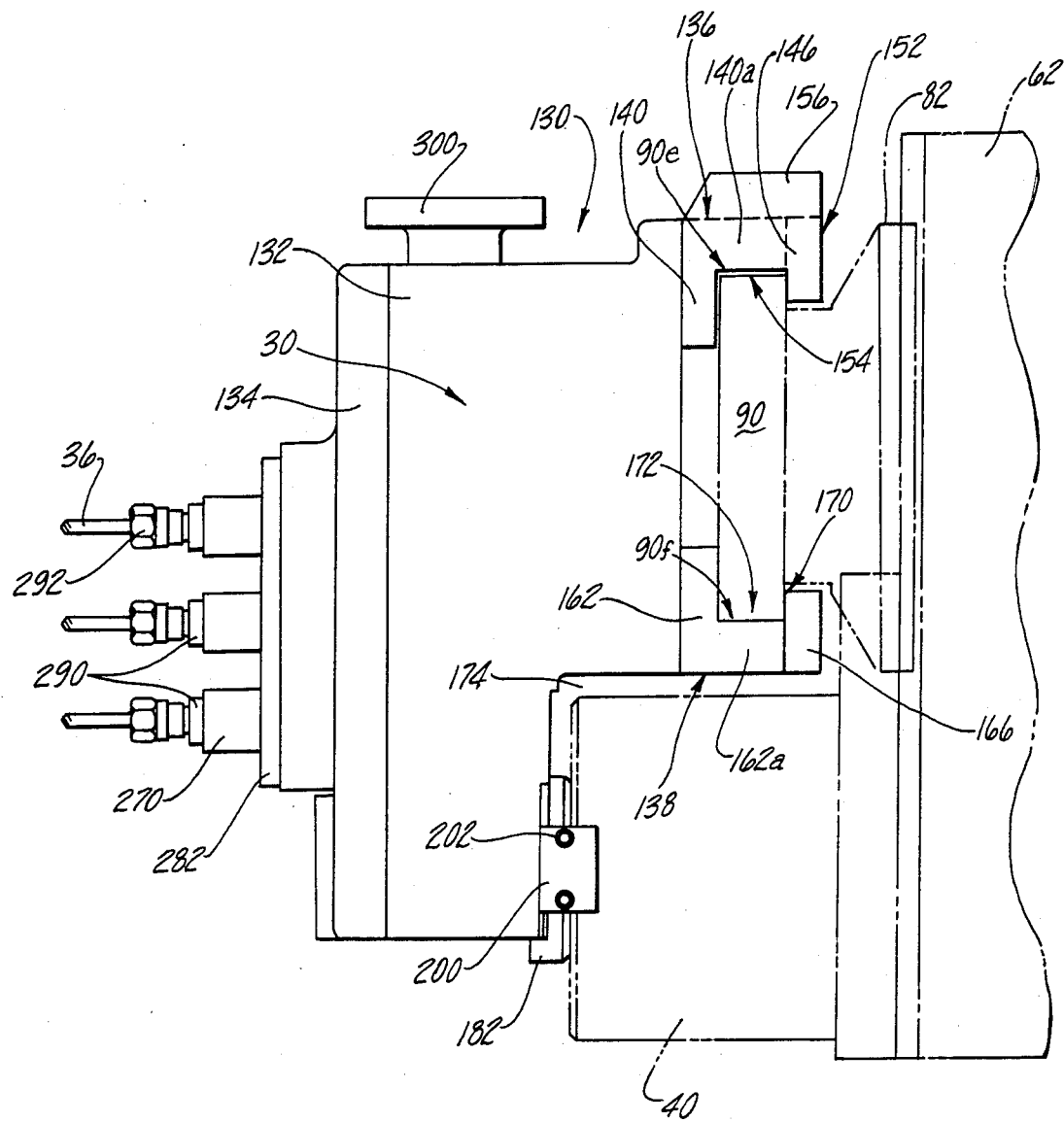
FIG. 10 is a side elevation of a tool head on the support rail member.

An illustrative multi-spindle tool head 30 stored in storage unit 14 and positionable on the rail member 90 is shown in FIGS. 10-13. The tool head 30 includes a housing 130 comprising an intermediate frame 132, a front plate 134 and upper and lower slide way members 136,138. Upper slide way member 136 includes an L-shaped member 140 attached by multiple machine screws 142 received in threaded bores (not shown) in the rear side of the intermediate frame 132 (side facing the primary spindle slide 62). A depending clamped member 146 is securely fastened to the horizontal leg 140a of the L-shaped member 140 by multiple machine screws 148 received in threaded bores 150 in the horizontal leg. It is apparent that the L-shaped member 140 and clamped member 146 together define a downwardly facing upper hook-like flange 152 having transverse channel 154 along its length shaped to be received slidably on the upper edge 90e of rail member 90 as shown in FIG. 10.

Figure 11:
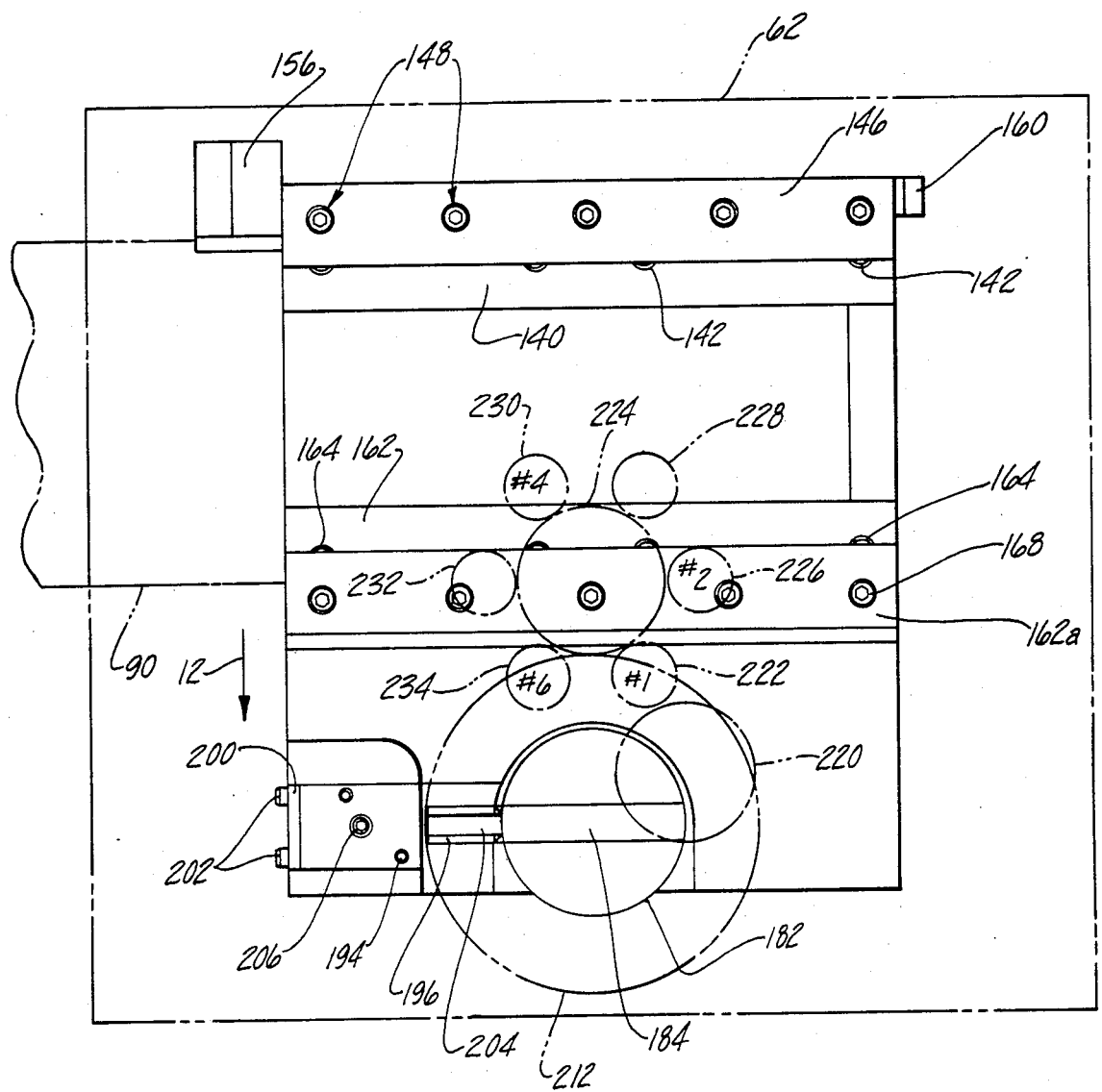
FIG. 11 is a rear elevation of the tool head of FIG. 10 in the direction of arrows 11.
Figure 12:
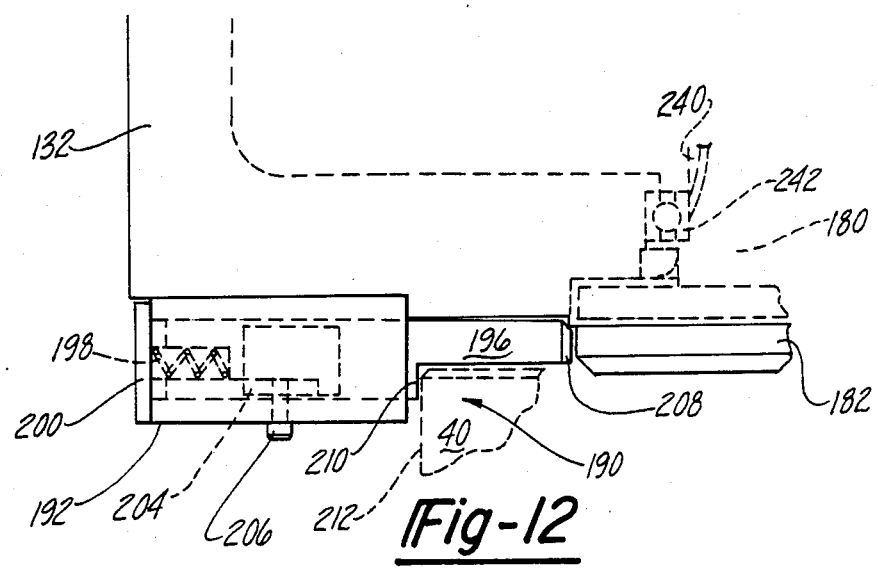
FIG. 12 is an elevational view taken along arrows 12 of FIG. 11.

A block hook 156 is attached by multiple machine screws 158 for purposes to be explained hereinbelow on the end of the hook-like flange 152 that is adjacent side S₁ of the machine tool when the tool head is slidably supported on rail member 90 as shown in FIG. 11. Attached on the end of the hook-like flange 152 oppositely disposed from block hook 156 is stopped member 160 which is adapted to abut against stop block 116 on the rail member 90 when the tool head is slid thereon to locate the tool head in proper position relative to primary spindle 40. Stopped member 160 also cooperates with air aperture 118 to allow sensing of the position of the tool head in proper position on the rail member 90 with the tool head drivingly coupled to the primary spindle 40 as will be explained.

Lower slide way member 138 is similar in construction to upper slide way member 136 and includes L-shaped member 162 attached to the rear side of intermediate frame 132 by machine screws 164 and clamped member 166 attached to the horizontal leg 162a of the L-shaped member 162 by multiple machine screws 168. As is apparent, L-shaped member 162 and clamped member 166 together define an upwardly facing hook-like flange 170 and channel 172 therealong complementary in shape to slidably receive the lower edge 90f of rail member 90.

The intermediate frame 132 has an inverted L-shaped cross-section, FIG. 10, so that when hook-like flanges 152, 170 are slidably received on rail member 90, the primary spindle 40 is received in the recess 174 under the tool head and in coaxial alignment with a gear shaft 180 when stopped member 160 is abutted against stop block 116. The gear shaft 180 is rotatably mounted between the front plate 134 and intermediate frame 132, FIG. 13. The gear shaft 180 includes a rearwardly facing coupling 182 with slot 184 to drivingly receive the complementary shaped key 41 on the primary spindle 40, FIG. 20, when the gear shaft and spindle are coaxially aligned. As shown best in FIG. 12, the coupling slot 184 is maintained in a selected horizontal reference position engageable with spindle drive key 41 by a spring biased pin lock mechanism 190. During tool head changing, the spindle 40 is positioned with its radial drive key 41 in the horizontal position adjacent side S₁ to drivingly engage in slot 184. The pin lock mechanism 190 includes a housing 192 fastened by multiple screws 194 to the rear side of the intermediate frame 132, pin lock member 196 biased toward coupling slot 184 by coil spring 198 held in housing 192 by cover 200 attached thereto by machine screws 202. The pin lock member 196 includes lateral slot 204 in which is received anti-rotation screw 206 to prevent rotation of the pin lock member but allowing lateral sliding thereof. The pin lock member 196 includes a nose 208 adapted to extend into coupling slot 184 when the gear shaft 180 is not drivingly coupled to the primary spindle 40 to maintain the slot 184 in a horizontal reference position. Pin lock member 196 also includes a shoulder 210 extending parallel with the primary spindle axis A and is adapted to be engaged by a non-rotating shoulder 212 on the primary spindle 40 and forced toward the housing 192 away from the coupling slot 184 to withdraw the nose 208 therefrom so as to permit free rotation of the gear shaft 180 by the primary spindle 40 when the tool head is in proper drivingly coupled position on the rail member 90 as determined by stopped member 160 abutting stop block 116 on the rail member.

When the tool head 30 is in proper position drivingly coupled to spindle 40 as established by stop block 116 being abutted by stopped member 160, the clamp bars 102 and piston clamps 109 on rail member 90 are hydraulically actuated to releasably clamp the tool head in this position. As mentioned hereinabove, actuation of clamp bars 102 causes upper and lower clamp pressure plates 100 to move outwardly toward the primary spindle slide 62 and this will cause pressure plates 100 to engage and clamp respective upper and lower clamped members 146 and 166 of hook-like flanges 152 and 170. The facing clamped surface of L-shaped members 140 and 162 will be drawn and clamped against the front side of the rail member 90 oppositely disposed from rear side 90a. Actuation of clamp bars 102 also causes piston clamps 109 to be pushed downwardly just past the bottom of rail member 90 into clamping engagement with the surface 162a on L-shaped member 162 of hook-like flange 170. In this way, the tool head 30 is releasably clamped in two orthogonal directions, parallel with the spindle axis A toward the primary spindle slide 62 and normal to axis A toward the Z-axis base 50. The tool head is unclamped simply by releasing hydraulic pressure on the clamp bars and piston clamps.

As shown best in FIG. 11 for a six-spindle tool head, the gear shaft 180 is meshed with spur gear 220 which in turn meshes and drives spur gear 222 on spindle #1. Spindle spur gear 222 in turn meshes with and drives central spur gear 224 which meshes with and drives the spur gears 226-234 on spindles #2-6 at the same rate as spindle #1. In this way, the primary spindle 40 through its key 41 can drive the spindles of the tool head.

Figure 13:
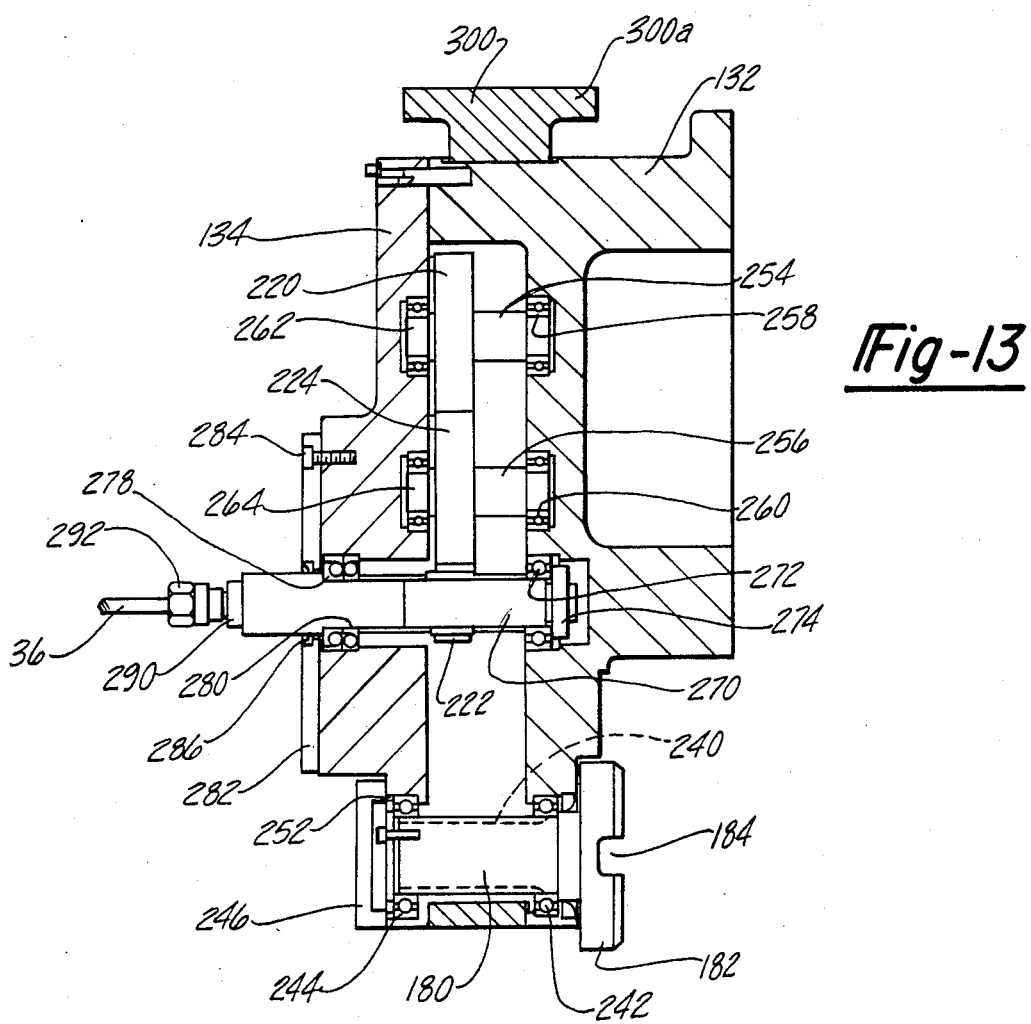
FIG. 13 is a sectional view taken arbitrarily through the tool head to show the gear train and individual spindle mounting technique.

FIG. 13 illustrates how the gear shaft 180, spindles #1-6, and other components of the gear train are rotatably mounted between front plate 134 and intermediate frame 132, although the gears and spindles are shown out of normal positions to facilitate showing the mounting technique used. For example, gear shaft 180 has longitudinal splines 240 and the rear end of the gear shaft 180 is rotatably mounted by ball bearing assembly 242 on intermediate frame 132. The forward end of gear shaft 180 is rotatably mounted by ball bearing assembly 244 in the front plate 134. A retainer cap 246 is fastened by screws 248 (only one shown) to the forward end of the gear shaft and engages the inner race of the bearing assembly 244 as shown. An annular cover plate 250 is fastened by suitable means on the front plate 134 and together with annular spacer 252 holds the outer race of the bearing assembly 244 in position.

Large diameter spur gears 220 and 224 are keyed on cylindrical shafts 254,256. The rear ends of shafts 254,256 are rotatably mounted in the intermediate frame 132 by ball bearing assemblies 258,260 while the forward ends are similarly mounted in front plate 132 by ball bearing assemblies 262,264. Each spindle #1-#6 is identical and includes a central shaft 270 and the respective spur gear 222, 226-234 keyed on an intermediate portion of the shaft. The rear end of each spindle shaft 270 is rotatably mounted by ball bearing assembly 272 positioned on the shaft by end collar 274. The forward end of each spindle shaft is mounted in a dual set of ball bearing assemblies 278,280 held in position between an annular shoulder on the shaft and an annular shoulder on the front plate 132 as shown. A front cover 282 is fastened onto the front plate 132 by multiple machine screws 284 and includes a seal 286 around the shaft 270 to prevent entry of foreign matter to the bearing assemblies 278,280. The forward working end 270a of spindles #1-#6 includes a threaded longitudinal bore which receives an externally threaded toolholder shank 290 of conventional construction with collet 292 to grippingly receive and hold a single shank tool 36 such as the drill bits illustrated and other single shank tools in known manner.

A lift post 300 is shown attached to the top of the intermediate frame 132 by machine screw (not shown). The lift post 300 includes an upper outwardly or radially extending flange or cap 300a for facilitating lifting by the overhead robot 20.

FIGS. 14-18 illustrate the tool head load mechanism 24 and tool head unload mechanism 26 in more detail. The load and unload mechanisms 24,26 are supported on a vertical hollow frame 310 which is secured to the base 50 on which column 52 is mounted by means of rigid coupling 312, also see FIG. 4. As is apparent, the load mechanism 24 is mounted above the unload mechanism 26 on the frame 310. The load mechanism 24 includes a pusher member 320 slidably supported for back and forth reciprocating movement on multiple (three) spaced apart flanged lower rollers 322 each of which is rotatably supported by bushing (not shown) on a shaft 324 threaded into a lower bracket 326 welded to the front wall 310a of the frame. The rollers 322 are thus freely rotatable as the pusher member 320 is slid thereover transversely or perpendicularly to the primary spindle axis A. A pair of spaced apart upper rollers 328 are similarly each rotatably supported by a bushing on shaft 330 threadably received in an upper bracket 332 welded to the front wall 310a. The pusher member 320 is thus confined and guided by lower and upper rollers 322 and 328 as it slides transversely back and forth.

Figure 16:
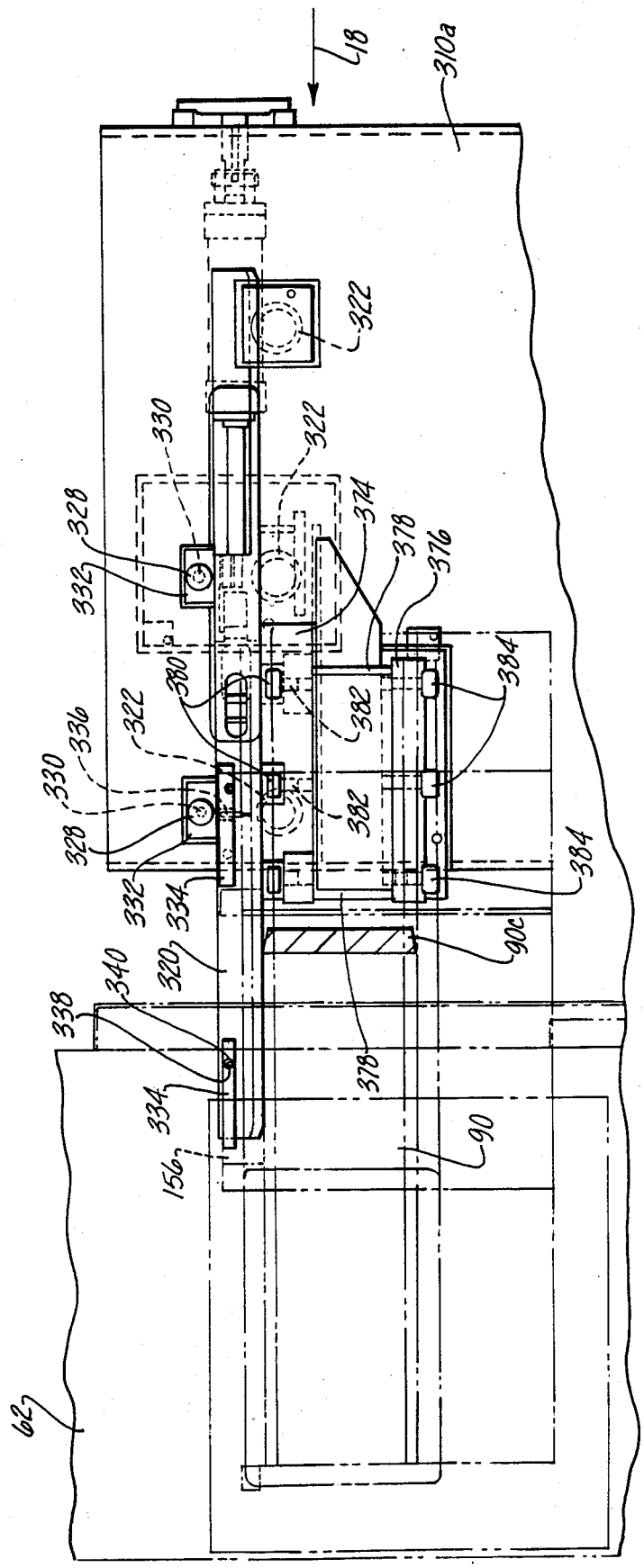
FIG. 16 is a front elevation of the load mechanism of FIG. 11.

Two dogs 334 are spaced apart along the length of the pusher member 320 and disposed in pockets or recesses 320a therein for engaging the block hook 156 on each tool head 30 (shown in phantom) carried on the load mechanism. Each dog 334 is pivotally attached to the pusher member 320 by a pivot machine screw 336 extending through a vertical bore in the dog and threaded into a vertical bore in the pusher member as best seen in FIG. 16 and by a threaded shaft 338 and nut 340, the shaft 338 extending into horizontal threaded bores in the dog and pusher member. Each dog includes a nose 334a for directly engaging the facing side of the block hook 156 as shown in pushing relation. A coil spring 342 is positioned in each pocket or recess 320a between the dog 334 and vertical pocket wall 320b to bias the nose end of the dog out of the pocket to insure pushing engagement with the block hook 156 on a tool head 30 when moved to the left in FIG. 14 and yet allow the dog to be cammed into the pocket against spring bias when the dog moves to the right in FIG. 14 during reciprocating incremental stroking.

Figure 14:
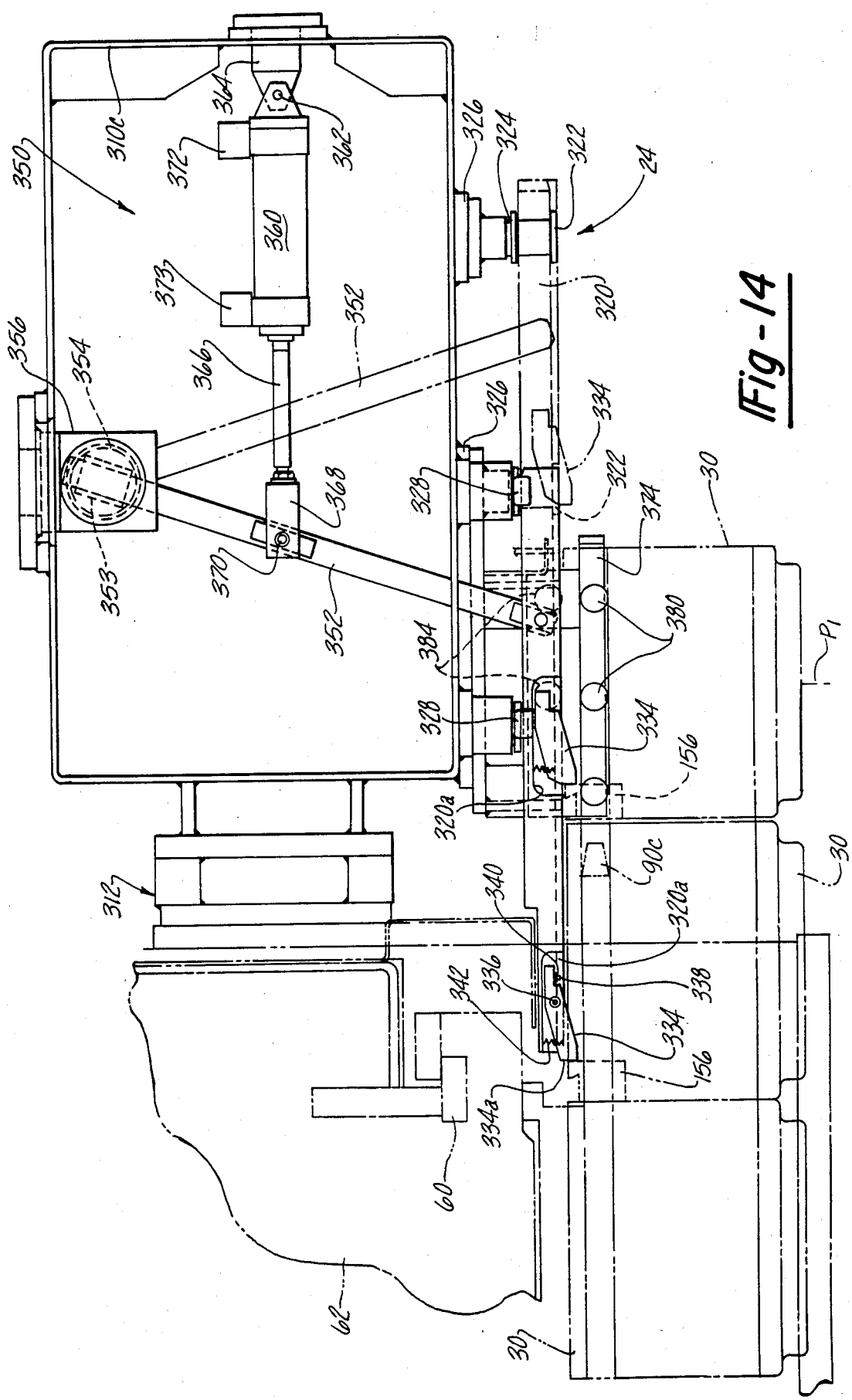
FIG. 14 is a plan view of the load mechanism and load rail.

The pusher member 320 is reciprocated (back and forth) in set incremental strokes to the left and right in the figures by means of a stroke mechanism 350 comprising stroke member 352 pivotally connected at one end by pin 353 and bushing 354 on bracket 356 on the rear wall 310b of the frame 310 and pivotally connected at the opposite end by pin 357 and bushing 358 to the pusher member 320. The two positions of the stroke member 352 are shown in FIG. 14. The stroke member 352 is moved back and forth between these positions by hydraulic cylinder 360 pivotally connected at one end by pin 362 and bracket 364 to lateral side wall 310c of frame 310 and having plunger or piston 366 pivotally connected at its free end by clevis 368 and pin 370 to the stroke member 352. The length of stroke is controlled by indicator switches 372 and 373 on the cylinder itself in known fashion. As shown best in FIG. 14, the pusher member 320 at its forward stroke position to the left is designed to position a tool head 30 on rail member 90 at the proper position determined by stop block 116 and stopped member 160 for being drivingly coupled to the primary spindle 40. Once the tool head is thusly positioned, the pusher member 320 is retracted to the right in FIG. 16 out of the way of the primary spindle slide 62 so that the primary spindle slide 62 and column 52 can be moved as required for machining.

A tool head 30 shown in phantom in FIGS. 16 and 18 is movably carried and guided on the load rail mechanism 24 having upper and lower load rail members 374,376 spaced apart vertically as shown and inter-connected by vertical plates 378 with the load rail members including rollers 380 and 384 described below. As best seen in FIG. 18, the load rail members 374,376 and interconnecting plates 378 are attached to the front wall 310a of the frame 310. The upper load rail member 374 carries a plurality of rollers 380 spaced apart in line so as to form rail means and rotatably mounted by bushings on shafts 382 threaded vertically into upper load rail member 374. It is apparent that the rollers 380 are received in the channel 154 defined by the upper hook-like flange 152 of the tool head and movably support the tool head on the load rail. The lower load rail member 376 carries a plurality of similar rotatable rollers 384 which abut the outside surface of the clamped member 166 forming a part of the lower hook-like flange 170. The tool head is thereby movably supported by the rollers 380,384 on load rail members 374,376. Rollers 384 could be positioned on lower rail member 376 to be received in the channel 172 defined by lower hook-like flange 170 rather than abutted as shown in the figures. Thus, rollers 380 and 384 would be received in respective channels 154,172.

It is apparent that the upper load rail member 374 includes rail rollers 380 which can be placed in generally end-to-end relation with the tapered free cantilevered end 90c of the support rail member 90 by movement of column 52 on the Z-axis ways 54 and primary spindle slide 62 on the Y-axis ways 60 to effect loading of a tool head 30 onto the rail member 90. By generally end-to-end relation is meant the support rail member and the load or unload rail member as the case may be are located relative to one another to support and carry the tool head such that the tool head mounting flanges 152,170 are aligned to be supportingly engaged by the rail member receiving the tool head. That is, the support rail member and load/unload rail members do not have to be in exact end-to-end alignment.

As shown in FIGS. 14, 16 and 18, a single tool head 30 is carried by the load mechanism 24 described for transfer onto the rail member 90 by two reciprocating strokes of the load cylinder 360. Of course, the load mechanism could be modified to accommodate multiple tool heads thereon.

Figure 15:
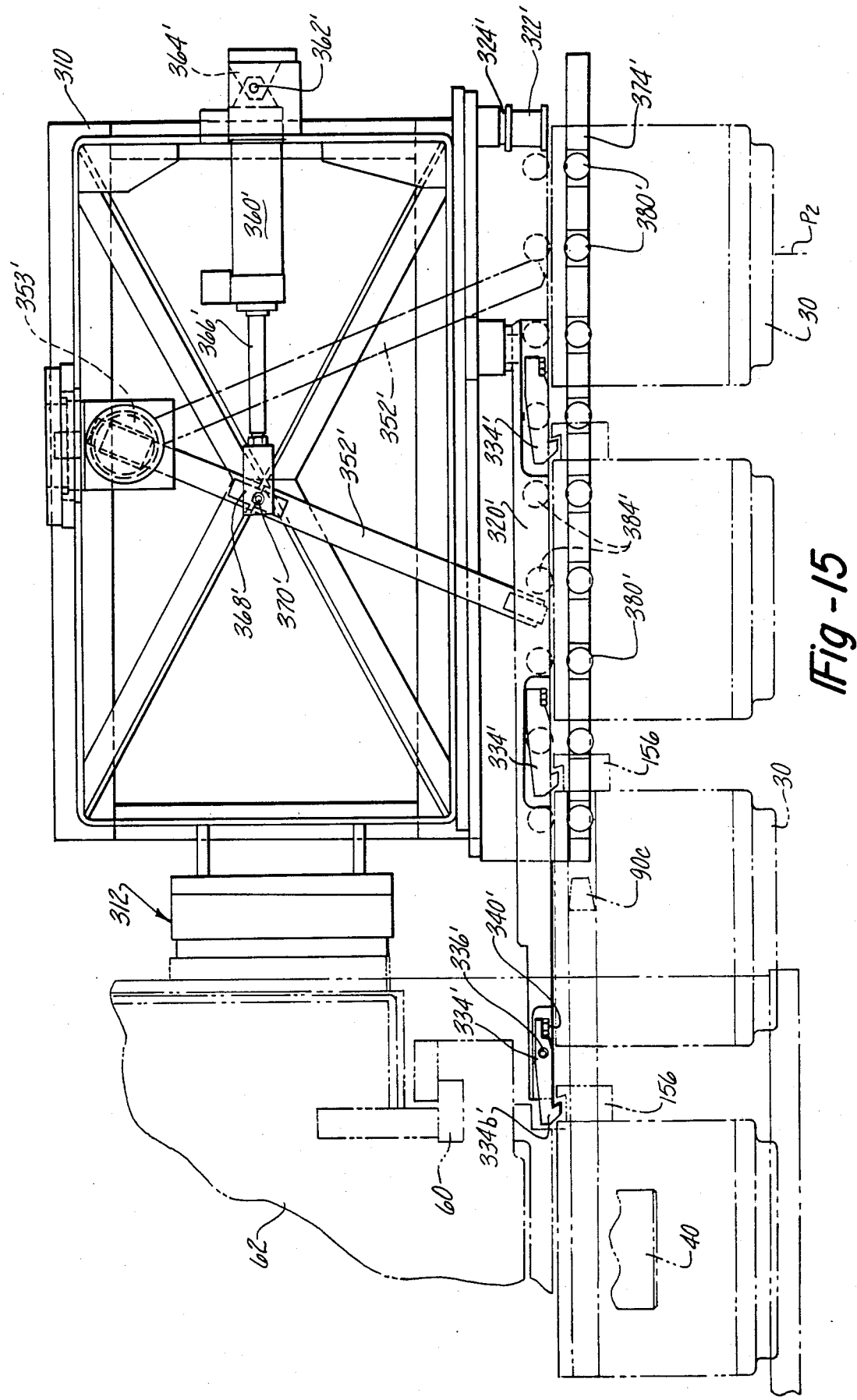
FIG. 15 is a plan view of the unload mechanism and unload rail.
Figure 17:
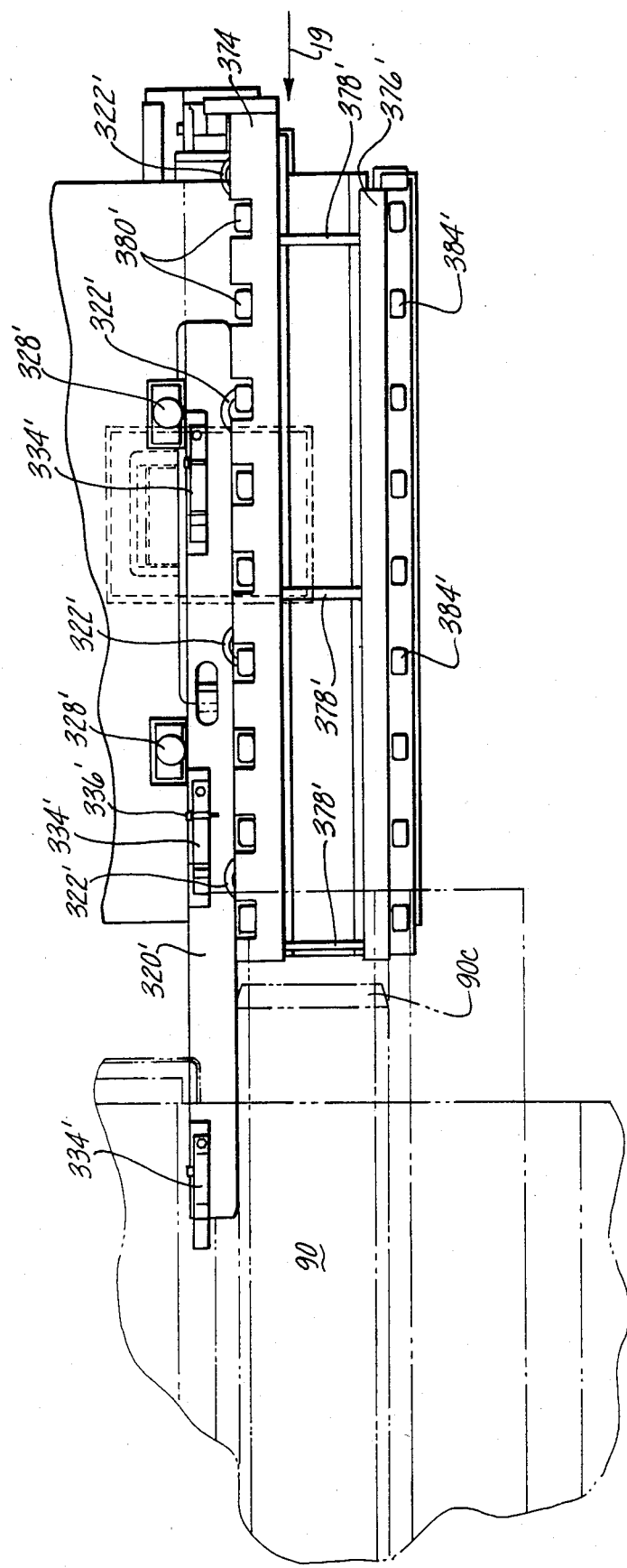
FIG. 17 is a front elevation of the unload mechanism of FIG. 15.
Figure 22:
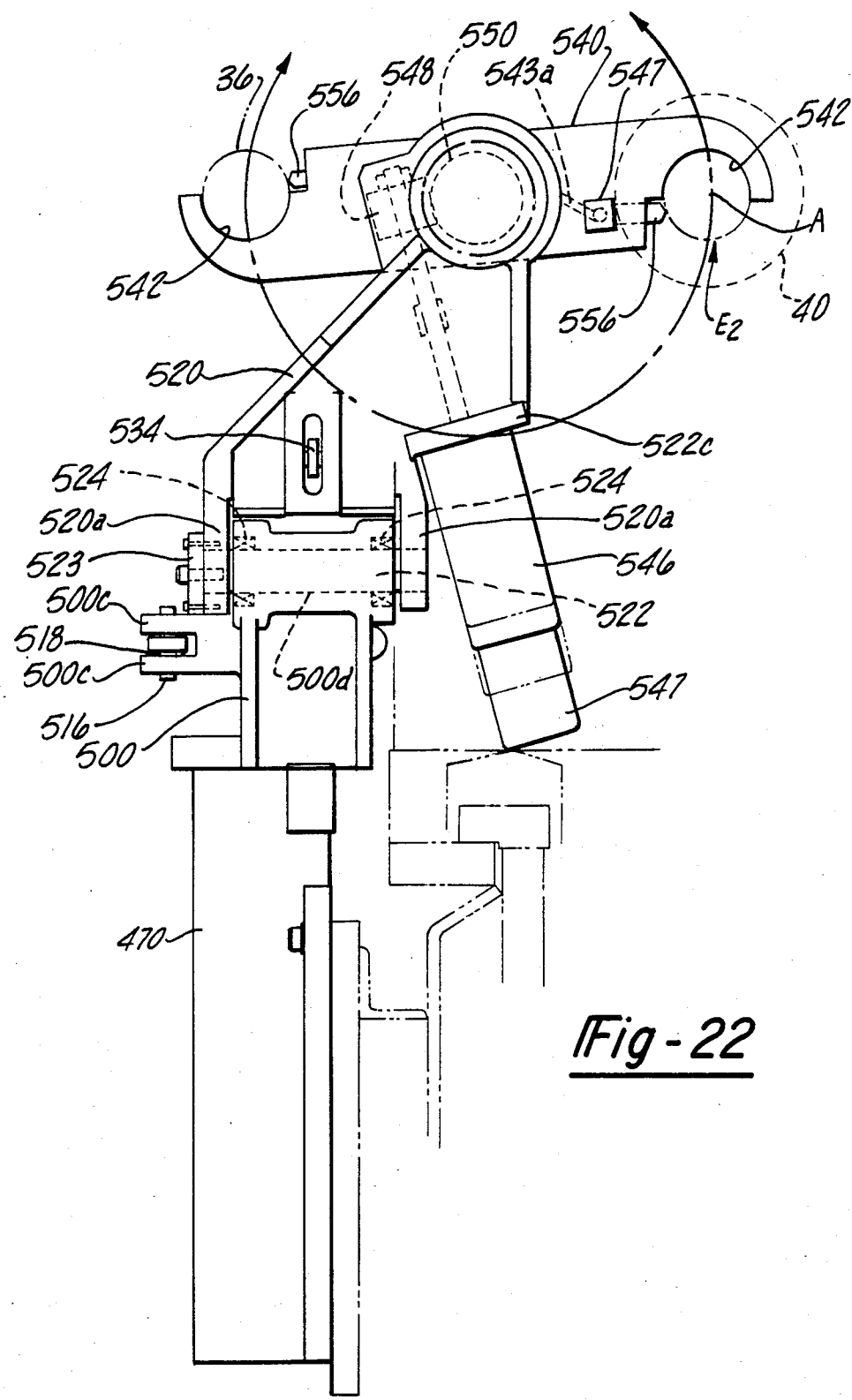
FIG. 22 is a front elevation of the tool changer in the same position.
Figure 23:
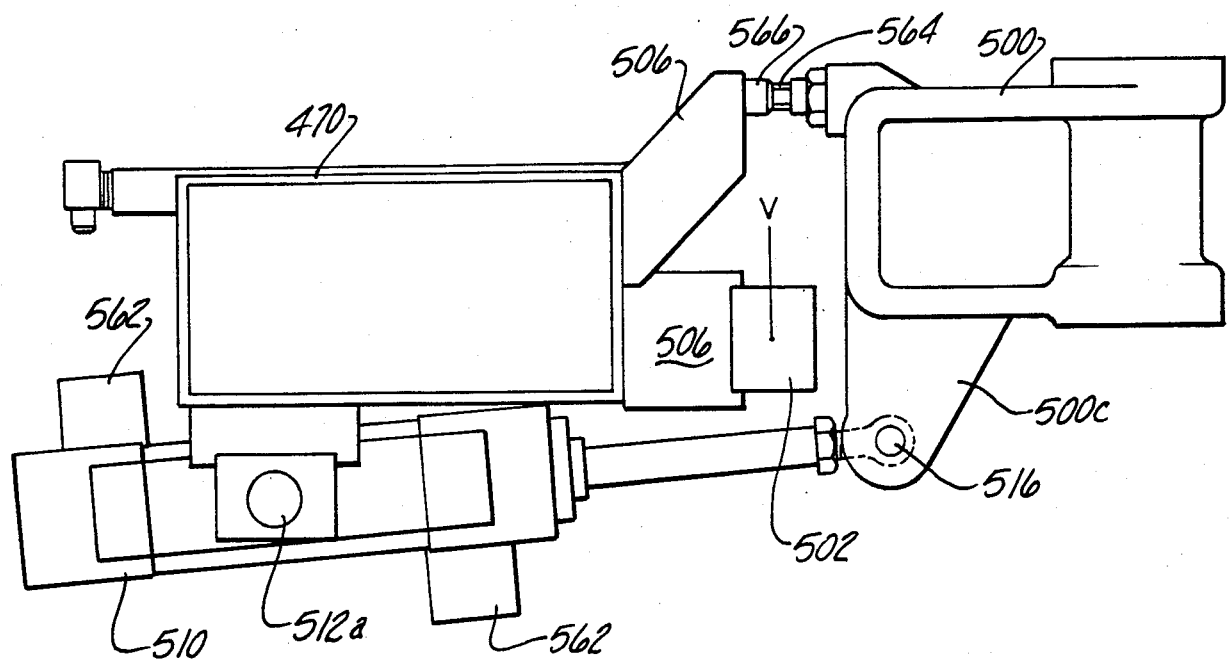
FIG. 23 is a view taken along lines 23—23 of FIG. 21.
Figure 24:
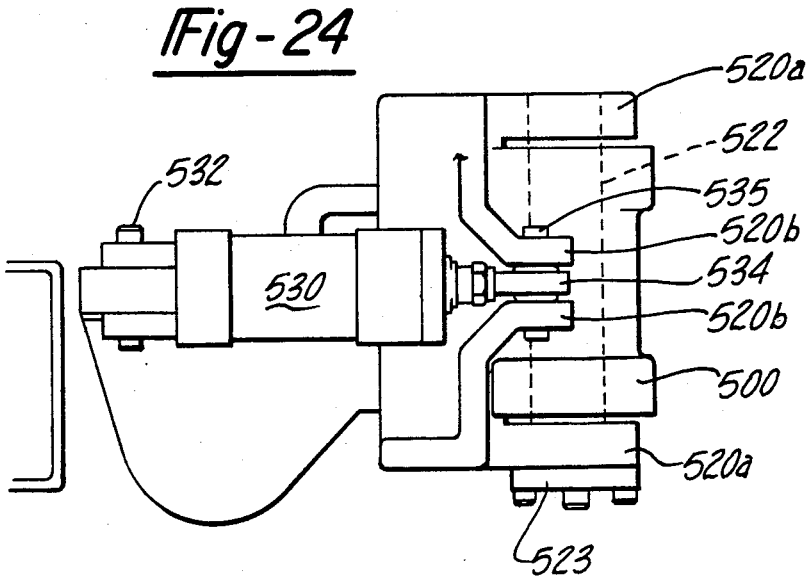
FIG. 24 is a view taken along lines 24—24 of FIG. 21.

The unload rail mechanism 26 is shown in FIGS. 15, 17 and 19 and operates to pull a tool head 30 off the support rail member 90 toward the right in FIG. 15 for tool head exchange purposes. As will be apparent from these Figures, the unload mechanism includes operative components for the most part the same as those used in the load mechanism 24 described hereinabove. In FIGS. 15, 17 and 19, such like or similar components are designated by like reference numerals primed.

Of course, an important difference between the load mechanism 24 and unload mechanism 26 is that the former pushes a tool head onto support rail member 90 whereas the latter pulls a tool head off the support rail member. To this end, the three dogs 334' on the puller member 320' of unload mechanism 26 have a hooked nose 334b' instead of the pusher nose 334a described above. The hooked nose 334b' is adapted to latch onto the block hook 156 of the tool head as shown best in FIG. 15 to pull the tool head in incremental steps to the right in that Figure as the puller member 320' is reciprocated back and forth in increments by the hydraulic cylinder 360'.

As is apparent, three strokes of the hydraulic cylinder from left to right are required to pull a tool head off the rail member 90 onto upper and lower unload rail members 374',376' to a head unload position relative to the overhead robot 20. In other words, the length of unload rail members 374',376' is longer than load members 374,376 of load mechanism 24 so that the unload position is displaced outwardly of the load position from side $S_1$ of the machine tool. This difference in length is readily discernible from comparison of FIGS. 14 and 16 with FIGS. 15 and 17.

Those skilled in the art will appreciate that other tool head changing mechanisms may be employed in lieu of the upper load mechanism 24 and lower unload mechanism 26 and their respective tool head pusher and puller actuators. The load mechanism and unload mechanism may be combined into a single operative unit.

The centerlines of the load position $P_1$ and unload position $P_2$ for the tool heads 30 on load and unload mechanisms 24 and 26 relative to the overhead robot 20 are shown best in FIG. 14. The robot 20 functions to transfer a tool head from the head storage unit 14 to the load position on the load mechanism 24 and to transfer a previously used tool head from the unload position on unload mechanism 26 back to the head storage unit depending upon the mode of operation of the machine tool.

To this end, the overhead gantry robot 20 is movably supported on an overhead framework 22 comprised of vertical corner support posts 402, longitudinal support members 404 and transverse support members 406 positioned adjacent side $S_1$ of the machining apparatus. In particular, the robot 20 includes driven wheels which ride on platform rails 412 extending between the transverse support members 406 parallel to longitudinal support members 404 to position the robot at a selected longitudinal position. The platform rails 412 include a two pairs of driven wheels 414 at opposite ends and the wheels 414 ride on the transverse support members 406 to position the robot at a selected transverse position. The robot 20 includes a gripper 417 which is openable and closeable onto the lift post 300 of the tool head 30 to grip or release same and which is also movable in the vertical direction to reach the load mechanism 24 and unload mechanism 26 as well as to position tool heads in the head storage unit 14 as will be explained herebelow. The robot 20 is capable and functions under computer control to load a tool head directly onto the load mechanism 24, in particular onto load rail members 374,376 and to unload or remove a tool head directly from the unload position of unload rail members 374',376' without manual participation.

The gantry robot 20 and overhead framework 22 illustrated and described are commercially available from GCA Corporation located at 3460 Lexington Avenue North, St. Paul, Minn. 55112

Figure 3:
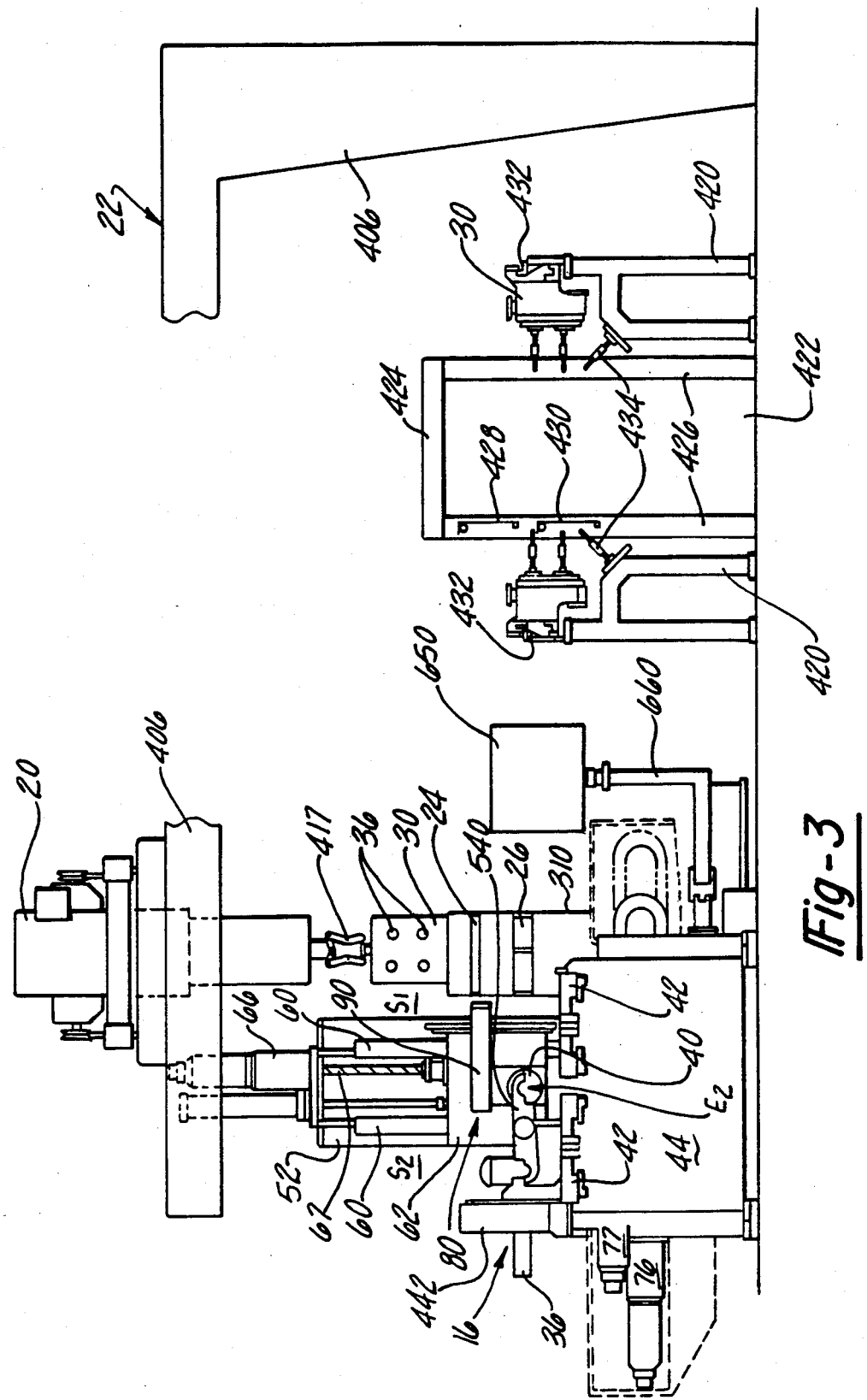
FIG. 3 is a front elevation of the apparatus of FIG. 1 in the direction of arrow 3.
Figure 4:
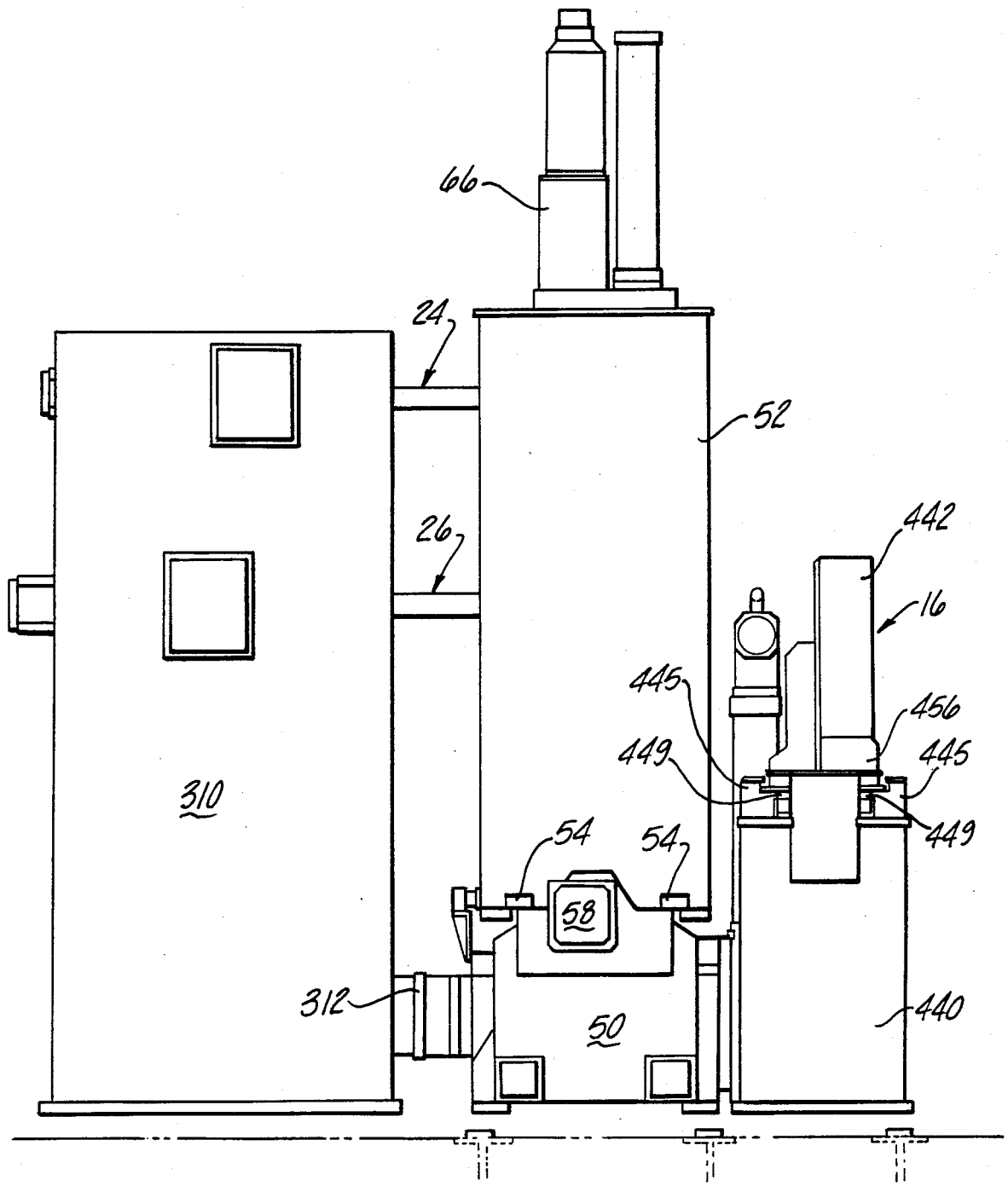
FIG. 4 is a rear elevation of the apparatus of FIG. 1 in the direction of arrow 4.

From FIGS. 1 and 3, it is apparent that the head storage unit 14 may comprise two spaced apart facing elongated storage tables 420 with individual tool head storage compartments $C_1$-$C_8$ and $C_9$-$C_{16}$ with an aisleway 422 therebetween. The aisleway 422 is protected from above by an overhead protective ceiling 424 supported on walls 426 disposed along the length of the aisleway 422. Upper and lower manually operated access doors 428,430 are provided to give access to tool heads stored in the compartments. Doors 428,430 can be provided with limit switch protection to insure they cannot be opened until movement of the overhead robot over the particular compartment is stopped. In each compartment, the tool head 30 is hung on a support rail 432 by the upper hook-like flange 152 so that an attendant can inspect, repair and otherwise work on the tool head. A supply of replacement tools 434 may be provided on the tables 420 so that worn or damaged tools on the tool head can be replaced if necessary.

Figure 26A:
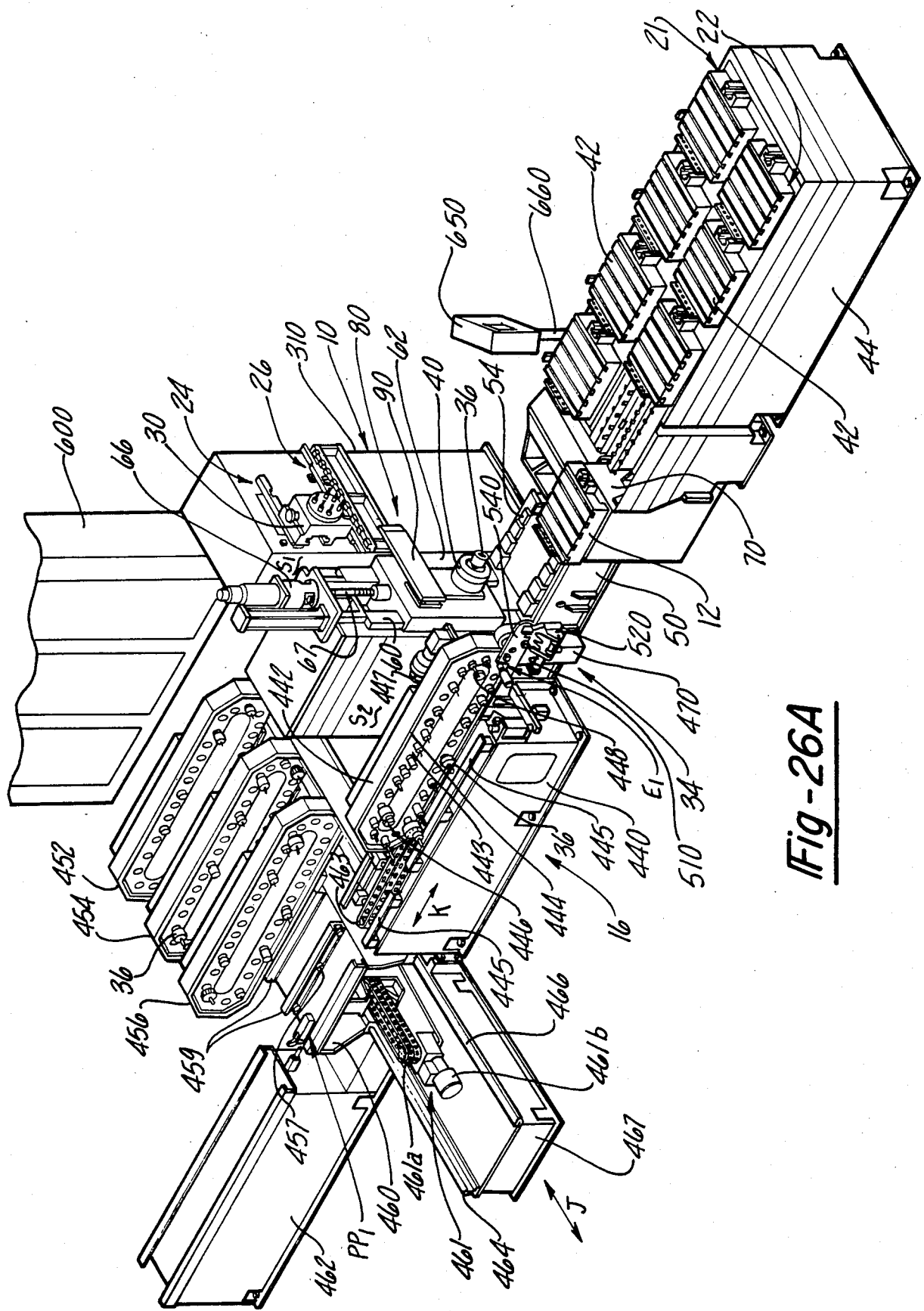
FIGS. 26A and 26B are a perspective view of a machining apparatus when the figures are viewed together, the tool head storage unit being different from that of FIGS. 1-3.
Figure 26B:
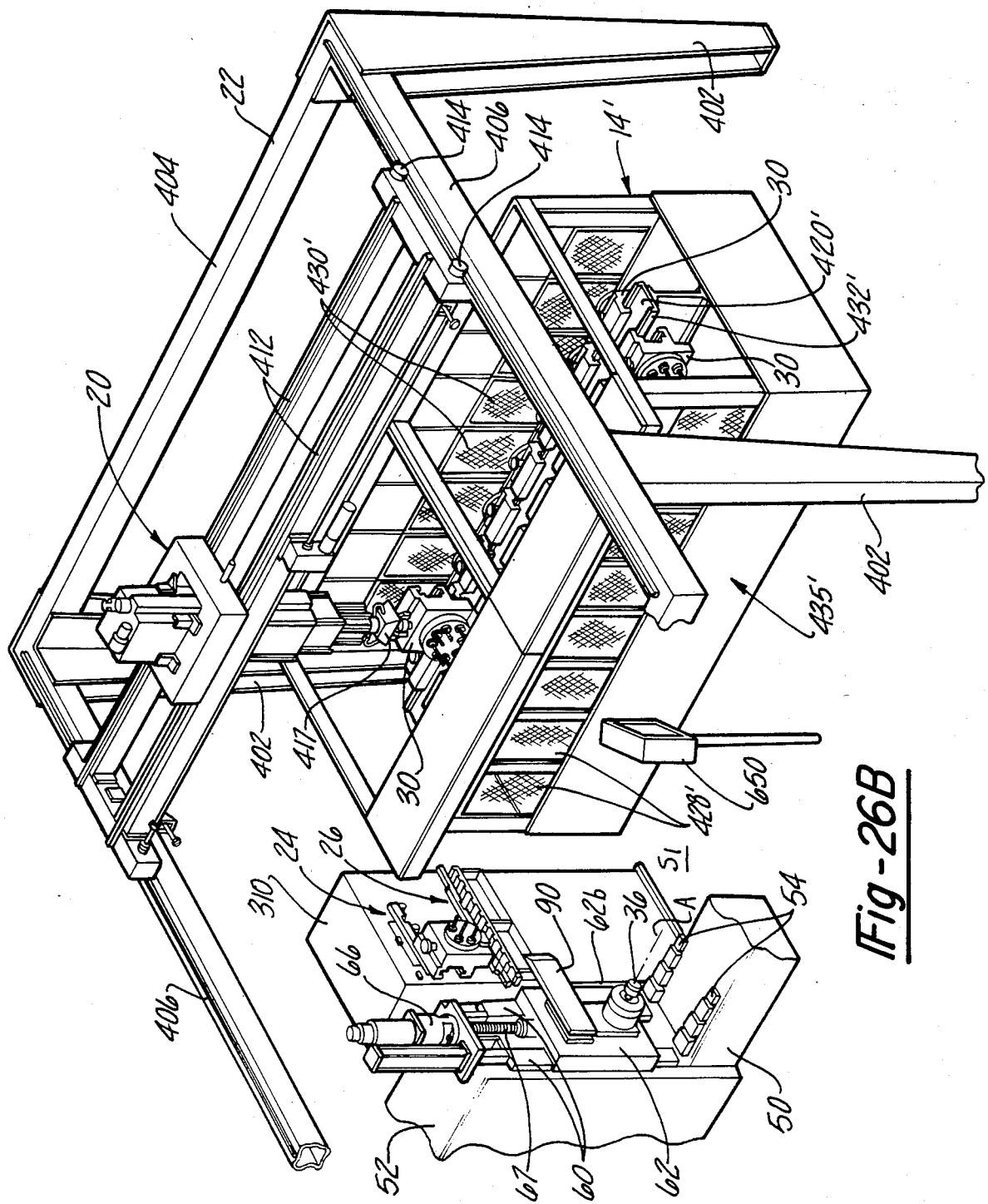

FIG. 26B illustrates another embodiment of a tool head storage unit for use in the invention. For example, the head storage unit 14' comprises an elongated storage table 420' with a pair of spaced parallel support rails 432' on which the upper hook-like flange 152 of each tool head 30 is hung and a pair of spaced parallel lower abutment rails against which the lower hook-like flange 170 abuts as shown. The tool heads 30 are placed on the storage table 420' by overhead robot 20 through the open ceiling of the storage enclosure 435'. Access to the tool heads is provided by multiple access doors 428' and 430' on opposite sides of the enclosure defining tool head compartments along opposite sides thereof.

Those skilled in the art will appreciate from the description hereinabove that the machining apparatus includes the capability to operate with single or multi-spindle tool heads 30 automatically conveyed between the load and unload mechanisms 24,26 and the head storage unit 14 by the overhead robot 20 and automatically loaded and unloaded relative to the tool head support rail member 90 on the primary spindle slide 60 by the load and unload mechanisms with the tool head driven directly by the primary spindle 40 when properly positioned on rail member 90. Importantly, no change-over or modification of the machine tool is required to enable operation in this mode.

It is apparent that other tool head storage units may be used in the invention in lieu of stationary unit 14 described hereinabove. For example, movable or rotary tool head storage units may be employed adjacent sides $S_1$ of the machine tool and, for small numbers of tool heads, may be combined with the tool head changing means having suitable actuators such as pusher or puller structures described above or other actuators and means to bring a tool head from storage in position to be loaded onto the support rail member 90 or unloaded therefrom to storage.

Those skilled in the art will also appreciate that the machining apparatus can be operated in an alternative mode wherein a single shank tool 36 can be chucked directly in the primary spindle 40 and exchanged between the single shank tool storage unit 16 on the side $S_2$ of the machine tool and the primary spindle 40 by means of the pivotal tool changer 34.

The single shank tool storage unit 16 includes a base 440 adjacent the side $S_2$ of the machine tool and on which a tool conveyor assembly 442 is supported in operative position relative to the pivotal tool changer 34 as shown in FIG. 26A. The tool conveyor assembly 442 includes an endless chain conveyor 443 mounted for rotation on the frame 444 of the assembly by a pair of spaced apart sprockets 446,448. The chain conveyor 443 includes a plurality of single shank tool carriers 450 adapted to releasably retain the shank of single shank tools 36 in known fashion. For example, carriers 450 are adapted to releasably retain a known #50 tool shank. The chain conveyor 443 is caused to revolve to bring a particular tool to a tool exchange position by a motor 447 rotatively driving one of the sprockets 446,448 such as the forward sprocket 448 shown in FIG. 26A. The tool conveyor assembly 442 rides on lower rollers 449 of guide tracks 445 on base 440 while being positioned onto or removed from the base 440. However, once the tool conveyor assembly is in position, the guide tracks and rollers are lowered and the assembly is locked onto stationary support pads.

Other multiple tool conveyor assemblies 452–458 like tool conveyor assembly 442 are shown in FIG. 1 stored on parallel guide tracks 459 with rollers 457 on a movable shuttle 460. The shuttle 460 is movable by reversible chain drive mechanism 461 in the direction of arrow J in FIG. 26A to position one of the tool conveyor assemblies 452–458 in position to be moved forward to an operative position relative to the tool changer 34 as shown in FIG. 26A. To substitute one tool conveyor assembly for another, the shuttle 460 is first moved to align the tracks 459 of the vacant storage position PP₁ with the track 445 on base 440 supporting the conveyor assembly, e.g., 442, in operative position. A reversible chain driven mechanism 463 like mechanism 461 moves the tool conveyor assembly, e.g., 442, to the vacant storage position on the shuttle. Then the shuttle is moved to align the guide tracks 459 carrying the replacement tool conveyor assembly 452–460 with the guide tracks 445 on base 440 and the replacement assembly is moved in the direction of arrow K into the operative position relative to the tool changer adjacent side $S_2$ as shown in FIG. 26A. The same reversible drive mechanism 463 on base 440 unloads and loads the tool conveyor assemblies thereon. The shuttle 460 can also be moved to place a particular tool conveyor assembly in the idle position on base 462 where individual tools can be replaced.

The shuttle 460 is slidably mounted on cross-slide 464,466 on base 467 and is moved as a unit along the cross-rails by any suitable drive means, such as a motor driven chain mechanism 461 having chain 461a and drive motor 461b.

The individual tool conveyor assemblies 442 and 452–458 as well as the shuttle 460 and driving means therefor are described in co-pending U.S. application Ser. No. 623,679 entitled "Tool Storage Slide Drive" filed in the names of Kenneth J. Sprenger and Kenneth O. Kolnes as joint inventors and of common assignee herewith, the teachings of which are incorporated herein by reference.

With reference to FIGS. 1–4, 21–25 and 26A–26B, the tool changer 34 is mounted on stationary upstanding base 470 adjacent the base of the machine tool and in front of the stationary base 440 on which the tool conveyor assembly 442 is shown supported. Tool changer base 470 is bolted or otherwise securely attached to base 50 of the machine tool. The tool changer 34 includes only pivotal motions and no linear motions that would require slide or guide ways and the like. The tool changer 34 comprises a lower pivot arm 500 mounted on the base 470 by a vertical pivot pin 502 so as to pivot about the vertical axis V. In particular, rectangular cross-section pivot pin 502 is fixedly mounted by machine screws to support brackets 506 extending from base 470. The pivot arm 500 includes upper and lower flanges 500a with counterbore 500b receiving the reduced diameter cylindrical ends of pivot pin 502 are journaled therein. Anti-friction bearings 508 are positioned in counterbores 500b as shown and journaled on the cylindrical ends of pivot pin 502. A bearing retainer cap 501 is positioned on the lower flange 500a to retain the bearings in position. The support arm 500 is caused to pivot about axis V by hydraulic cylinder 510 mounted on base 440 with its plunger or piston 507 pivotally connected to the support arm 500. The cylinder 510 is received in a support housing 512 having upper and lower pins 512a pivotally mounted on upper and lower bracket arms 514 extending from the side 470b of base 470 and spacing the cylinder sufficiently therefrom to provide clearance for its pivoting. The cylinder 510 is pivotally connected between flanges 500c by pin 516 and spherical bushing 518. An upper pivot arm 520 is in turn pivotally mounted on the lower pivot arm 500 by horizontal pivot pin 522 extending perpendicular to the pivot axis of pin 502 (lower arm 500), primary spindle axis A and Z-axis ways 54. The upper pivot arm 520 includes spaced apart flanges 520a fixedly coupled to the ends of pivot pin 522 by collar 523 screwed thereto. The upper pivot arm thus pivots in a vertical plane in the direction of arrow H toward and away from the spindle 40 in the spindle tool exchange position. In the tool exchange position at tool conveyor assembly 442 shown for example in FIG. 26A, the upper pivot arm 520 pivots on a vertical plane toward and away from the tool carrier 450 at the exchange position. The pivot pin 522 is journaled in a pair of spaced anti-friction bearings 524 received in horizontal bore 500d of lower pivot arm 500 as shown. The pivot pin 522 is thus rotatable in bore 500d. A hydraulic cylinder 530 is pivotally mounted on shoulder 500e of the lower pivot arm 500 by pin 532 and has a plunger or piston 534 pivotally connected by pin 535 to flanges 520b on the upper pivot arm 522 to pivot same. Pivotal movement of upper pivot arm 522 is controlled by suitable limit switches 560 on hydraulic cylinder 530 or otherwise operatively disposed relative thereto. Pivotal movement of lower pivot arm 500 is similarly controlled by limit switches 562 on cylinder 510. Stop member 564 on the lower arm engages stop button 566 on bracket 506 to provide precise positioning of the arm in a tool change position at the primary spindle 40.

A tool changer arm 540 having tool shank receiving sockets 542 at opposite ends is rotatably mounted at the upper end of the upper pivot arm 522 as shown best in FIG. 3. Arm 540 includes shaft 540a journaled in bearings 541 as shown. The tool changer arm is rotated by an electric servo motor 546 through worm gear 548 and worm wheel 550 or other suitable means to grip a tool in the primary spindle 40 by releasably gripping it in one socket 542a. Motor 546 is bolted to a flange 522c on the upper arm as shown and may include a position encoder 547. Hydraulically actuated lock pins 556 of known type and operation extend into sockets 542 to releasably grip the flange 36a of the #50 tool shank. In particular, each lock pin 556 is slidable in the changer arm 540 and includes tapered end 556a engaged by a tapered end 543a of a piston 543 in housing 547. A coil spring 545 biases piston 543 to cause each lock pin to extend into the V-shaped flange of tool shank 36. The lock pin is released by fluid pressurizing chamber 549 to slide piston 543 against the bias of spring 545 to release the wedge effect provided by engagement of tapered ends 556a and 543a. Hydraulic fluid is supplied through passage 543a extending through the arm and its shaft 540a as shown in FIG. 21. The lock pins are in effect floating in the tool changer arm when the piston 543 is biased against the spring 545 and are released from the V-shaped flange of the tool shank by rotation of the tool changer arm 540 while the tool shank is releasably held in either the spindle 40 or tool carrier 450 during tool exchange. Tool changer arms of the general construction described above are known in the art.

In operation, after a tool in spindle 40 has been releasably gripped for removal by the spring biased lock pin 556 of the right hand shank-receiving socket 542 of tool changer arm 540 for removal, the upper pivot arm 520 is pivoted by cylinder 530 away from the primary spindle 40 about pivot pin 522 to remove the tool from the spindle 40. The tool changer arm 540 is then rotated clockwise 180° to place a replacement tool carried in the other tool shank-receiving socket 542 in position to be inserted into the spindle. The pivot arm 520 is then pivoted toward the spindle to effect tool insertion. The tool changer arm 520 is then rotated counterclockwise 90° to a vertical position and piston 543 is fluid biased to disengage socket lock pin from the tool inserted in the spindle as described in the preceding paragraph. After the upper pivot arm 520 is pivoted and the arm 540 is rotated to release from the tool, the lower pivot arm 500 is pivoted about pivot pin 502 with the upper pivot arm 520 and tool changer arm 540 in the vertical positions to bring the tool changer arm 540 adjacent to tool conveyor assembly 442 on side $S_2$. During pivoting of pivot arm 500, the used tool is carried in the lower socket 542 of the vertically oriented changer arm 540. Pivot arm 520 is then pivoted away from the tool conveyor assembly 442. The tool changer arm 540 is rotated clockwise 90° to align the used tool in the lower tool shank-receiving socket 542 with an empty tool carrier 450 on chain conveyor 443 placed by chain conveyor movement in tool exchange position $E_1$ to receive the tool. Upper pivot arm 520 is then pivoted toward the empty tool carrier to insert the tool shank therein. The lock pin 556 releasably holding the tool shank is released after the tool shank is inserted as described above; i.e., by pressurizing piston 543 and by rotating changer arm 540 90° counterclockwise. After the tool changer arm is rotated counterclockwise 90°, the chain conveyor 443 is revolved to search for the desired replacement tool which is positioned at tool exchange position $E_1$. Then, the tool changer arm is rotated clockwise 90° to releasably grip a replacement tool placed in the tool exchange position $E_1$ by the additional chain conveyor movement and upper pivot arm 520 is pivoted away from the tool carrier member to withdraw the replacement tool therefrom. The changer arm 540 is then rotated counterclockwise 90° to a vertical position with the replacement tool in the lower socket 542. Pivot arm 520 is then pivoted toward the conveyor assembly to a vertical position. The lower pivot arm 500 is then swung 90° to tool exchange position $E_2$ to repeat the sequence there to remove a used tool from the spindle and insert the replacement tool thereon.

For example, the tool changer arm 540 is rotated from the vertical position clockwise 90° to releasably grip the used tool shank in the spindle. Thereafter, the sequence of motions described above is repeated. Of course, the sequences of pivoting of lower and upper pivot arms 500 and 520 and rotation of tool changer arm 540 can be varied as described. During single shank tool changing, the spindle 40 is positioned with its drive key 41 in a vertical position toward the base 50 to drivingly engage a slot in the tool flange in known manner, see U.S. Pat. No. 4,173,819.

For example, the arm 540 is rotated clockwise 90° to releasably grip the used tool shank in the spindle. Thereafter, the sequence of motions described above is repeated. Of course, the sequences of pivoting of lower and upper pivot arms 500 and 520 and rotation of tool changer arm 540 can be varied as described. During single shank tool changing, the spindle 40 is positioned with its drive key 41 in a vertical position toward the base 50 to drivingly engage a slot in tool shank 36a in known manner, see U.S. Pat. No. 4,173,819.

In any sequence, it is apparent that the lower pivot arm 500 is swung between the spindle axis and axis of the tool or tool carrier member at the tool exchange position $E_1$ at tool conveyor assembly 442. Typically, the axis of the tool in the tool carrier member 450 at the tool exchange position is perpendicular to the spindle axis as shown and pivot arm 500 is swung 90°. Of course, the tool axis could be angularly disposed at other angles relative to the spindle axis and the lower pivot arm can be designed to swing to accommodate these other angular relations. Upper pivot arm 520 typically pivots 25° from vertical to remove and insert tools as described. It is also apparent that the spindle axis and axis of the tool or tool carrier member at the respective tool exchange positions E₁ and E₂ are placed in generally coplanar relation to enable operation of the pivotal tool changer 34 as described. Typically, the spindle 40 is positioned in the desired coplanar relation with the tool axis by movement of the primary spindle slide in the Y-axis direction while the tool conveyor chain 443 is revolved until the desired tool carrier member 450 is at the tool exchange position shown in FIG. 26A.

The pivotal tool changer referred to hereinabove is described and claimed in co-pending application Ser. No. 623,677 entitled "Pivotal Tool Changer" filed in the names of Thomas A. Powell and Kenneth J. Sprenger, of common assignee herewith and the teachings of which are incorporated herein by reference.

Those skilled in the art will appreciate that other tool changers known in the art may be used on the machining apparatus described hereinabove in lieu of the pivotal tool changer described and in combination with other known tool conveyor assemblies or mechanisms.

As mentioned hereinabove, the machine tool, tool head load/unload mechanism, overhead robot, single shank tool changer, single shank tool conveyor assemblies and other components of the machining apparatus are under the common control of a programmable computer (not shown) which is housed in cabinets 600 near the machining apparatus. An operator control unit 650 is carried on a pedestal 660 near the work table 12 and permits the operator to communicate with the computer and also to initiate and modify machining programs and to control certain machine components manually if necessary. Typically, a conventional paper tape reader (not shown) is also disposed on the cabinets 600 to input machining programs into the computer. The operator controls the paper tape reader from control unit 650.

And, while certain specific and preferred embodiments of the invention have been described in detail hereinabove, those skilled in the art will recognize that various modifications and changes can be made therein within the scope of the appended claims which are intended to include equivalents of such embodiments.

We claim:

1. A machining apparatus comprising:
   (a) a machine tool including a first slide movable in a first direction and having a single spindle mounted on the front for chucking and rotating a single shank tool or alternatively drivingly coupling to a tool head about a spindle axis extending in a second direction transverse to said first direction and a second slide carrying the first slide and movable in the second direction, said first slide having a tool head support rail mounted fixedly thereon extending transversely in a third direction across the front relative to the first and second directions past one side of the machine tool terminating in a cantilevered end and from which the tool head hangs with the support rail supportively receiving and positioning the tool head for drivingly coupled engagement with the spindle, said tool head support rail including a fluid-actuated clamp member movably mounted therein to clamp the tool head in drivingly coupled position relative to the spindle and including fluid passage means therein for supplying fluid pressure to said clamp member from a fluid pressure source,
   (b) a stationary tool head storage unit adjacent said one side of the machine tool for storing a plurality of tool heads,
   (c) tool head changing means adjacent said one side of the machine tool including a tool head load means and tool head unload means spaced apart in the first direction, said tool head load means including a roller load rail extending transversely in the third direction for carrying a tool head and pusher means for pushing a tool head from the load rail onto the tool head support rail when the load rail and cantilevered end of said support rail are placed in generally end-to-end relation by slide movement and said tool head unload means including a roller unload rail extending transversely in the third direction and puller means for pulling a tool head from the support rail onto the unload rail when the unload rail and cantilevered end of said support rail are placed in generally end-to-end relation by slide movement,
   (d) overhead robot means adjacent said one side of the machine tool movable between the tool head storage unit and the tool head changing means and having a depending tool head gripper for carrying a tool head between the tool head storage unit and load rail and unload rail including loading a tool head onto the load rail and unloading a tool head from the unload rail of the tool head changing mechanism,
   (e) a single shank tool storage unit adjacent an opposite side of the machine tool from said one side for storing a plurality of single shank tools, and,
   (f) a single shank tool changer positioned between the single shank tool storage unit and spindle adjacent said opposite side of the machine tool for exchanging a single shank tool between the spindle and single shank tool storage unit when the machine tool is not machining with a tool head for chucking and rotation of the single shank tool by said spindle means.

2. A machining apparatus comprising:
   (a) a machine tool having a vertically movable slide means mounted thereon for rotation about a spindle axis and a tool head support rail means thereon for supporting a tool head in drivingly coupled relation to the spindle means, said tool head support rail means extending transversely relative to the spindle axis toward a side of the machine tool and extending past said slide so as to terminate in a cantilevered end and from which the tool head hangs, said support rail means including clamp means movably mounted therein for clamping the tool head in drivingly coupled relation relative to the spindle and including means therein for actuating the clamp means,
   (b) tool head changing means adjacent said side of the machine tool and including changing rail means extending transversely toward said tool head support rail means for movably carrying a tool head and means for moving a tool head transversely between the changing rail head transversely between the changing rail means and tool head support rail means when they are in generally end-to-end relation to change a tool head relative to the spindle means, and
   (c) means for relatively vertically moving the slide means and tool head changing means to position the tool head support rail means and changing rail means in generally end-to-end relation such that the tool can be moved transversely therebetween by the tool head changing means.

3. The machining apparatus of claim 2 wherein the tool head changing means includes tool head load means and tool head unload means spaced apart from one another, said tool head load means including a transversely extending load rail means and a pusher means for pushing a tool head from the load rail means onto the support rail means into the drivingly coupled position when the load rail means and unload rail means are placed in generally end-to-end relation, said tool head unload means including a transversely extending unload rail means and a puller means for pulling a tool head from the support rail means to the unload rail means when the support rail means and unload rail means are placed in end-to-end relation.

4. The machining apparatus of claim 2 which includes tool head storage means adjacent said side of the machine tool and means for moving tool heads between a storage position of the storage means and an exchange position relative to the changing rail means.

5. The machining apparatus of claim 2 which further includes a single shank tool storage means adjacent another side of the machine tool for storing a plurality of single shank tools and a single shank tool changer adjacent said another side of the machine tool for exchanging a single shank tool between the spindle means and single shank tool storage means when the machine tool is not operating with a tool head.

* * * * *